(12) United States Patent
Resch et al.

(10) Patent No.: US 8,782,492 B2
(45) Date of Patent: Jul. 15, 2014

(54) UPDATING DATA STORED IN A DISPERSED STORAGE NETWORK

(75) Inventors: Jason K. Resch, Chicago, IL (US); Wesley Leggette, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 159 days.

(21) Appl. No.: 13/588,350

(22) Filed: Aug. 17, 2012

(65) Prior Publication Data

US 2013/0086447 A1    Apr. 4, 2013

Related U.S. Application Data

(60) Provisional application No. 61/542,923, filed on Oct. 4, 2011.

(51) Int. Cl.
| | |
|---|---|
| *G11C 29/00* | (2006.01) |
| *G06F 11/00* | (2006.01) |
| *G06F 3/06* | (2006.01) |
| *G06F 11/14* | (2006.01) |
| *G06F 15/173* | (2006.01) |

(52) U.S. Cl.
CPC .............. *G06F 11/00* (2013.01); *G06F 11/1446* (2013.01); *G06F 3/06* (2013.01); *G06F 3/0604* (2013.01); *G06F 2211/1028* (2013.01); *G06F 3/067* (2013.01); *G06F 15/17331* (2013.01)
USPC .............................. 714/764; 714/6.2; 711/114

(58) Field of Classification Search
CPC .............. G06F 3/067; G06F 15/17331; G06F 2211/1028; G06F 3/06; G06F 11/00; G06F 3/0604; G06F 11/1446
USPC .................................. 714/6.2, 764; 711/114
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — John Trimmings
(74) *Attorney, Agent, or Firm* — Garlick & Markison; Timothy W. Markison

(57) ABSTRACT

A method begins by a dispersed storage (DS) processing module receiving a modified data object, wherein the modified data object is a modified version of a data object and the data object is divided into a plurality of data segments and stored in the DSN. The method continues with the DS processing module mapping portions of the modified data object to the plurality of data segments that includes creating a middle data segment of a second plurality of data segments based on a corresponding middle data segment of the plurality of data segments when a portion of the portions corresponds to middle data of the modified data object. The method continues with the DS processing module encoding the middle data segment using a dispersed storage error coding function to produce an encoded data segment and overwriting the corresponding middle data segment with the encoded data segment in the DSN.

18 Claims, 23 Drawing Sheets

(56) References Cited

U.S. PATENT DOCUMENTS

| | | | |
|---|---|---|---|
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,483,318 B2* | 1/2009 | Ogihara et al. | 365/200 |
| 8,429,369 B2* | 4/2013 | Ogihara et al. | 711/170 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0068899 A1* | 3/2008 | Ogihara et al. | 365/189.04 |
| 2008/0183975 A1* | 7/2008 | Foster et al. | 711/153 |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2010/0161916 A1* | 6/2010 | Thornton et al. | 711/154 |
| 2012/0179869 A1* | 7/2012 | Flynn et al. | 711/114 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

* cited by examiner

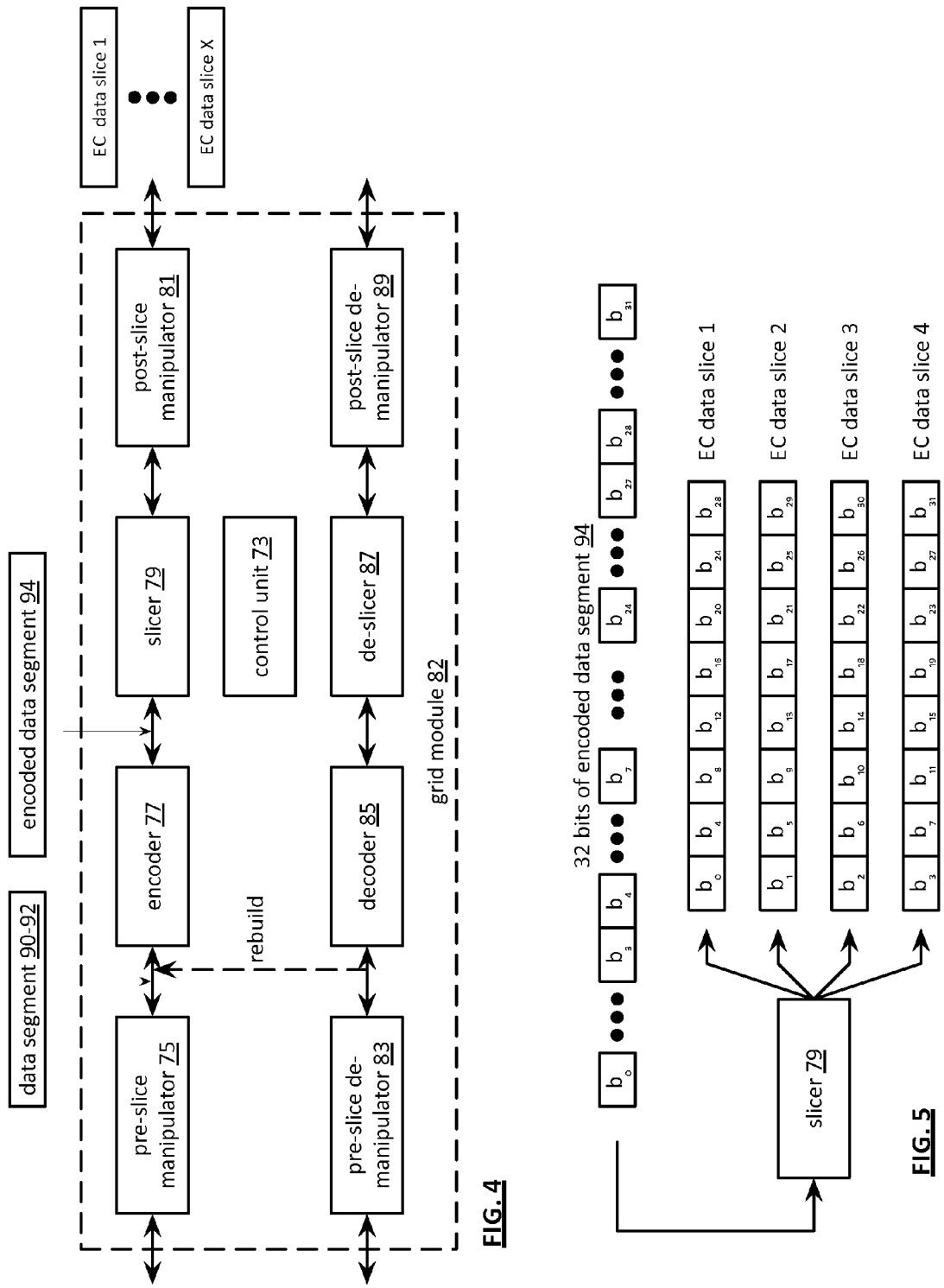

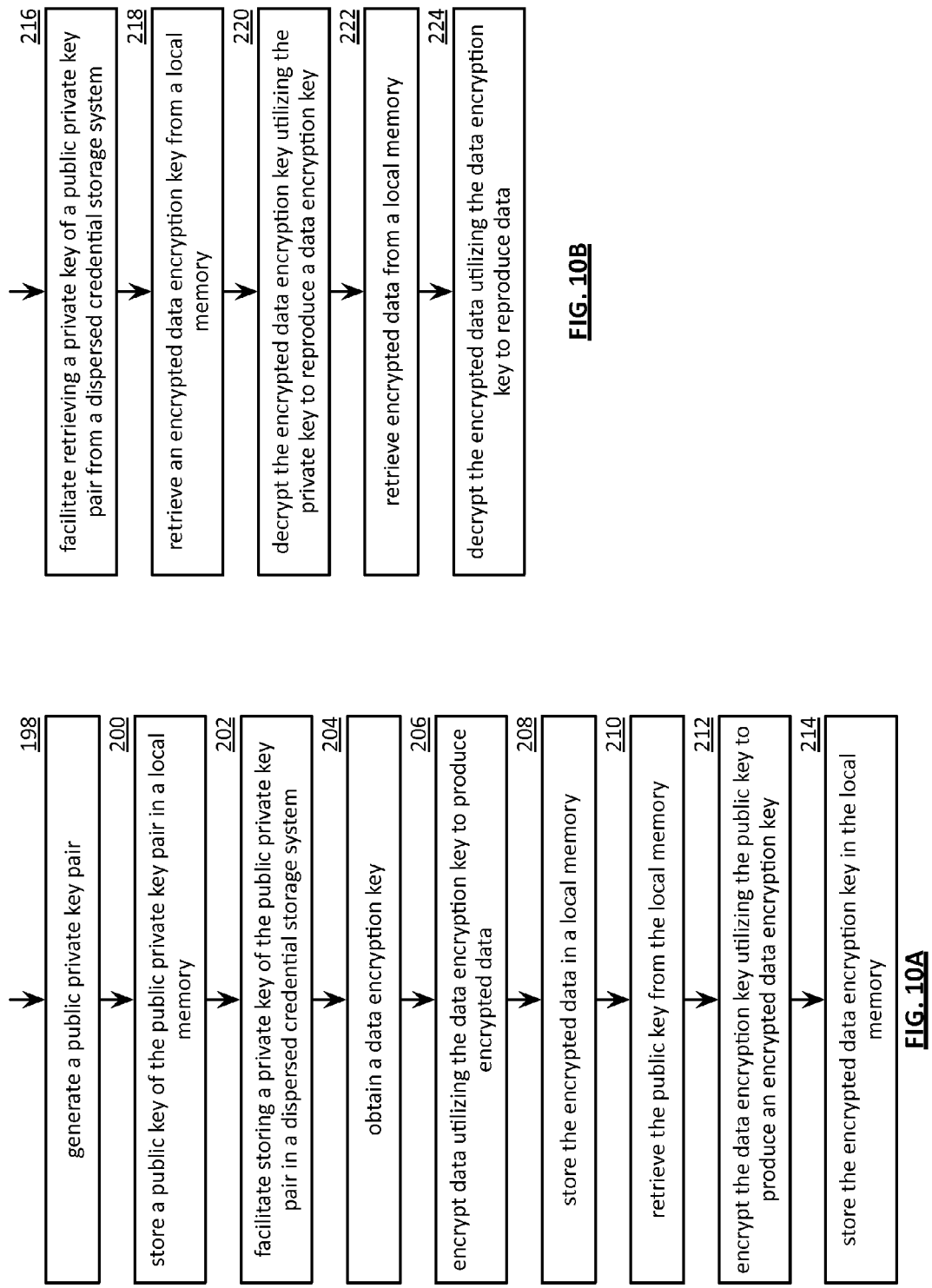

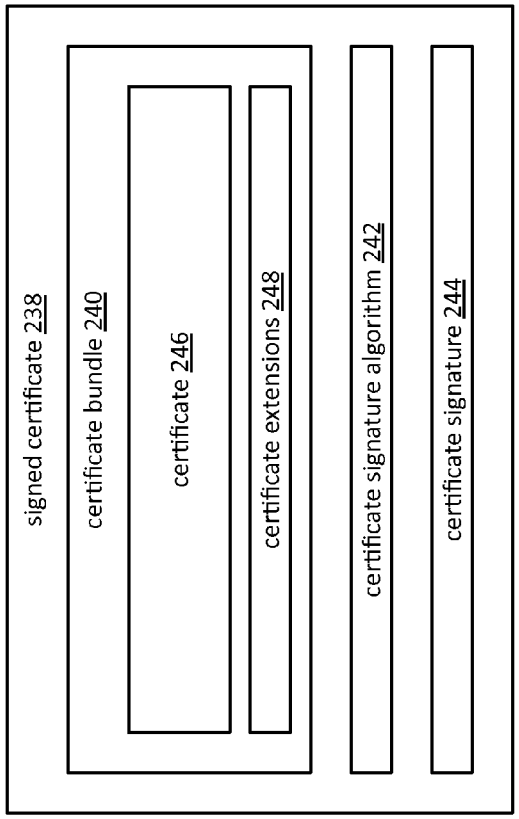

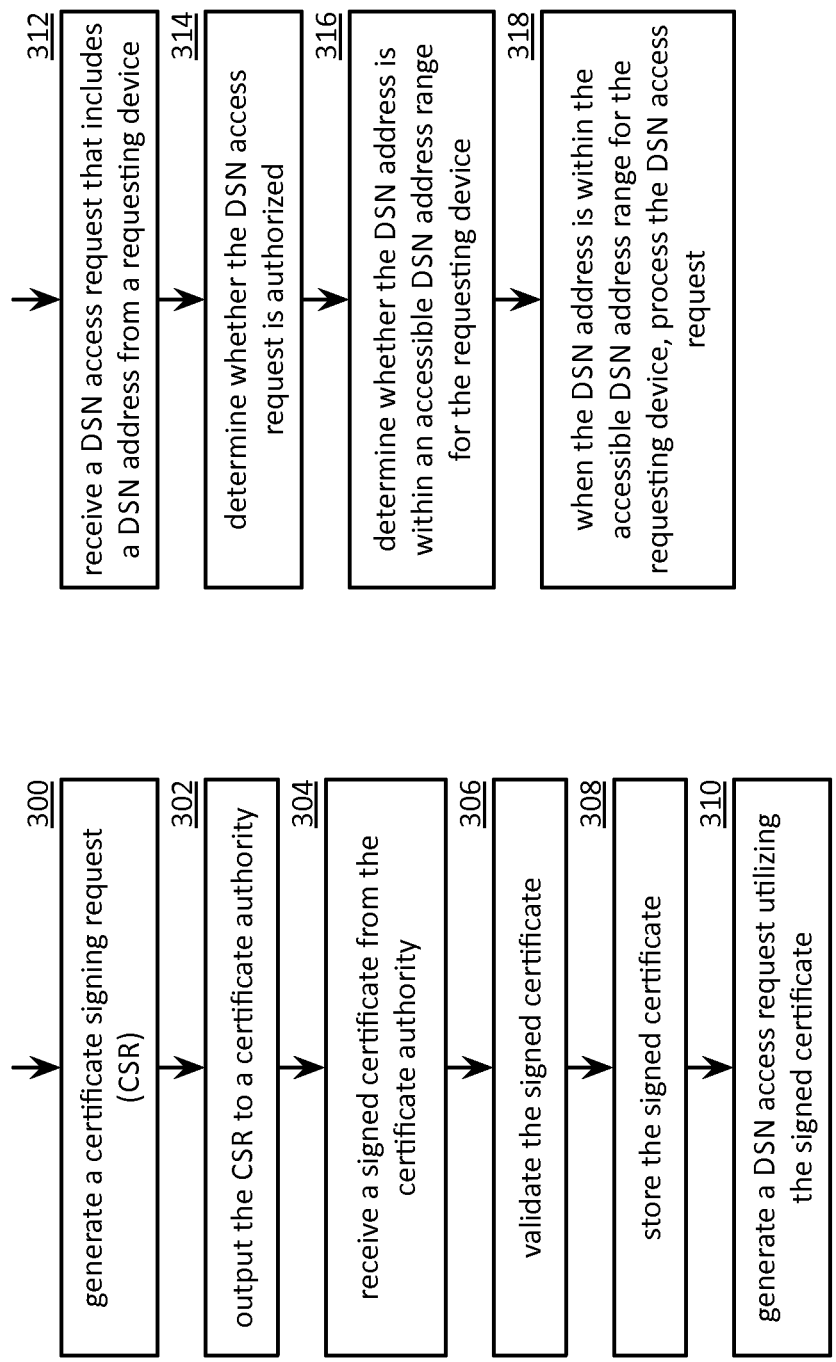

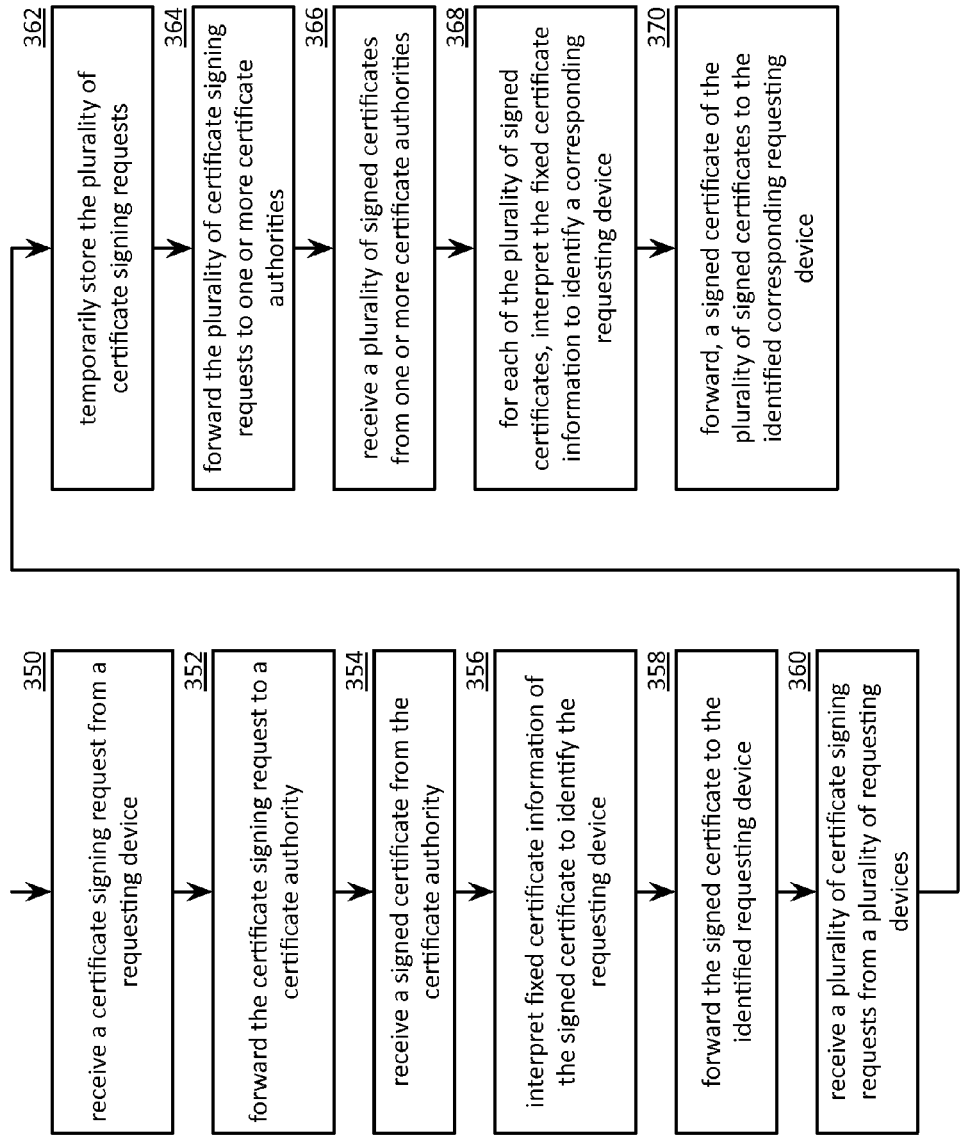

FIG. 13A original data object 372
- segment 1
- original data 374
  - segment 2
  - segment 3
  - segment 4
- segment 5 modified data object 375
- original data 376
  - segment 1
  - segment 2
- new data 380
- modified segment 3
- original data 378
  - segment 4
- segment 5

FIG. 13B original data object 372
- segment 1
- original data 374
  - segment 2
  - segment 3
  - segment 4
- segment 5 modified data object 382
- original data 384
  - segment 1
- modified segment 2
- new data 388
- modified segment 3
- original data 386
  - modified segment 4
- segment 5 metadata database 450

| metadata 1 | metadata 2 | ... | metadata M | file source name 452 |
|---|---|---|---|---|
| Sept 1, 2011 | long 40.1 | ... | lat -87.2 | FA032 |
| Sept 2, 2011 | long 40.5 | ... | lat -87.3 | B3C44 |
| Sept 3, 2011 | long 40.2 | ... | lat -87.7 | EF902 |

FIG. 14A backup table 454

| date 456 | backup source name 458 |
|---|---|
| Sept 3, 2011 | D468A |
| Sept 4, 2011 | EE540 |
| Sept 5, 2011 | B69DB |

FIG. 14B

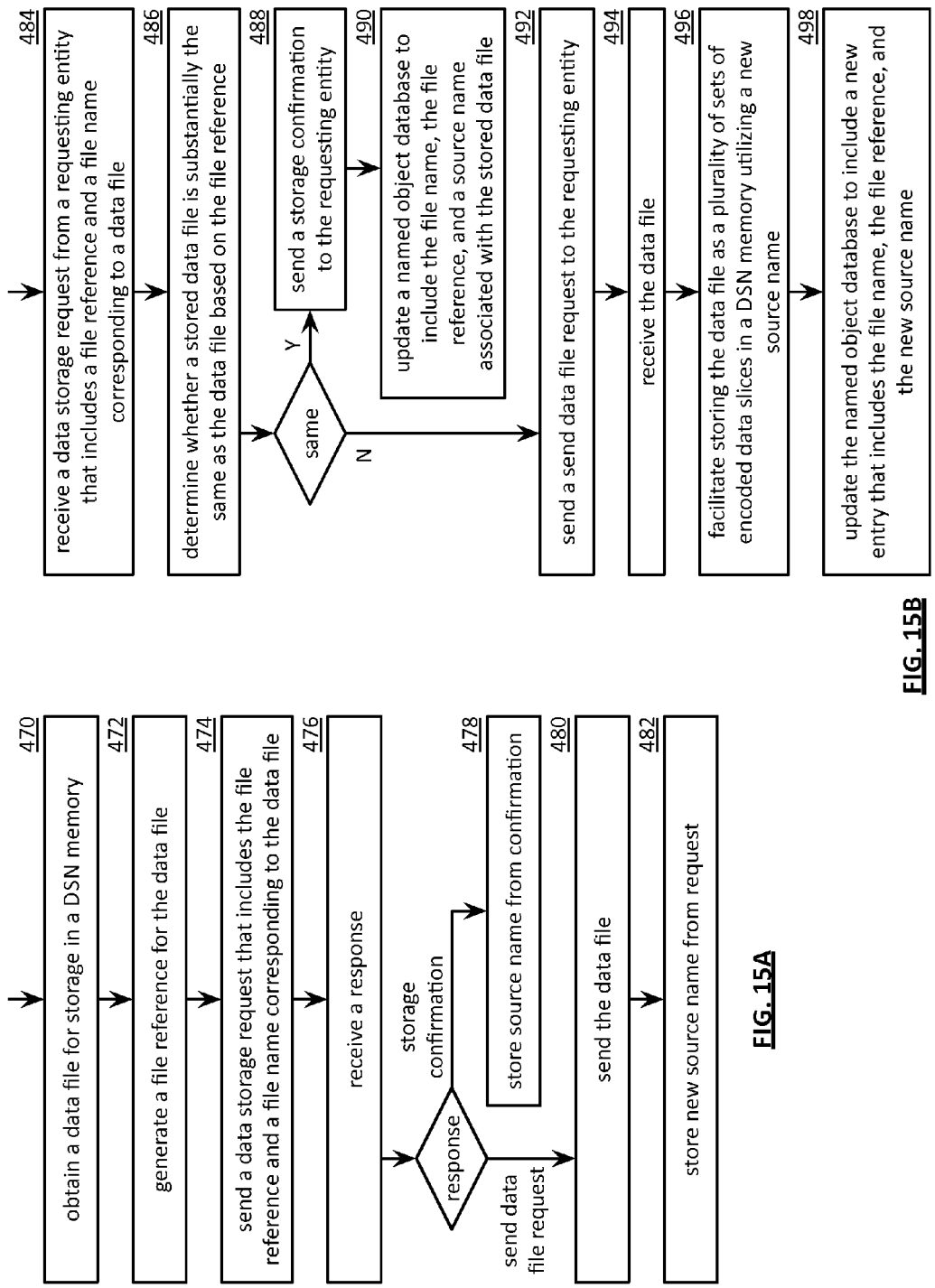

UPDATING DATA STORED IN A DISPERSED STORAGE NETWORK

CROSS REFERENCE TO RELATED PATENTS

The present U.S. Utility patent application claims priority pursuant to 35 U.S.C. §119(e) to U.S. Provisional Application No. 61/542,923, entitled "Storing Passwords in a Dispersed Credential Storage System" filed Oct. 4, 2011, which is incorporated herein by reference in its entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller. Data is stored in a memory device in accordance with the data storage format such that any subsequent updates to the data requires overwriting the stored data in the memory device. The rewriting of updated data may be costly in terms of utilization of the interfacing between the computer's processing function and the storage system.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the present invention;

FIG. 5 is a diagram of an example embodiment of error coded data slice creation in accordance with the present invention;

FIG. 10A is a flowchart illustrating an example of storing data encryption information in accordance with the present invention;

FIG. 10B is a flowchart illustrating an example of retrieving data encryption information in accordance with the present invention;

FIG. 11B is a diagram illustrating a digital certificate structure in accordance with the present invention;

FIG. 11C is a diagram illustrating an example of certificate extensions structure in accordance with the present invention;

FIG. 11E is a flowchart illustrating an example of obtaining a signed certificate in accordance with the present invention;

FIG. 11F is a flowchart illustrating an example of processing a dispersed storage network (DSN) access request in accordance with the present invention;

FIG. 12C is a flowchart illustrating another example of processing a certificate signing request in accordance with the present invention;

FIG. 13A is a diagram illustrating an example of a before and after modified data object to data segment mapping in accordance with the present invention;

FIG. 13B is a diagram illustrating another example of a before and after modified data object to data segment mapping in accordance with the present invention;

FIG. 14A is a diagram illustrating an example of a metadata database structure in accordance with the present invention;

FIG. 14B is a diagram illustrating an example of a backup table structure in accordance with the present invention;

FIG. 15A is a flowchart illustrating an example of storing data in accordance with the present invention; and FIG. 15B is a flowchart illustrating an example of processing a data storage request in accordance with the present invention.

DETAILED DESCRIPTION OF THE INVENTION

Figure 1:
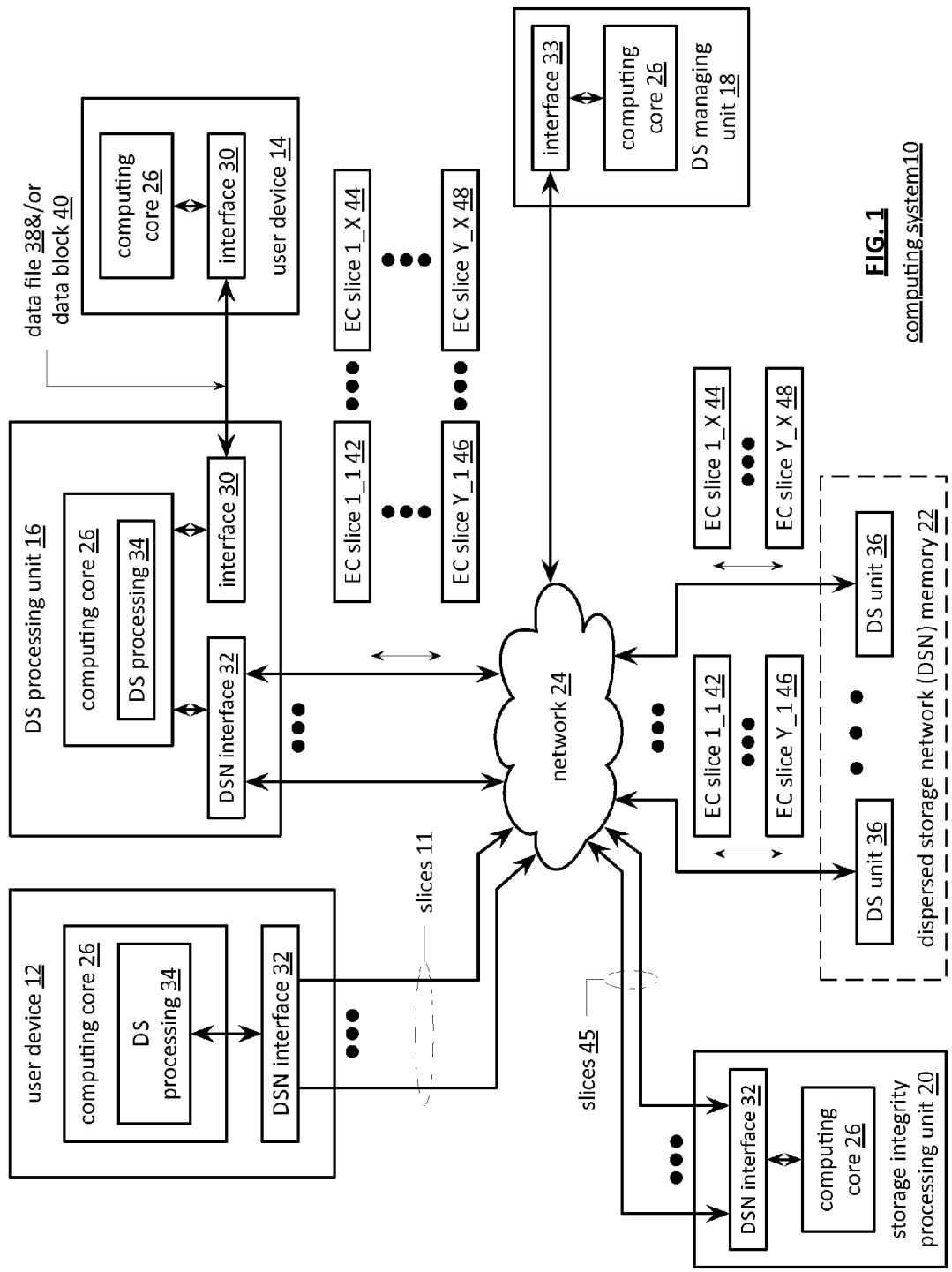
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
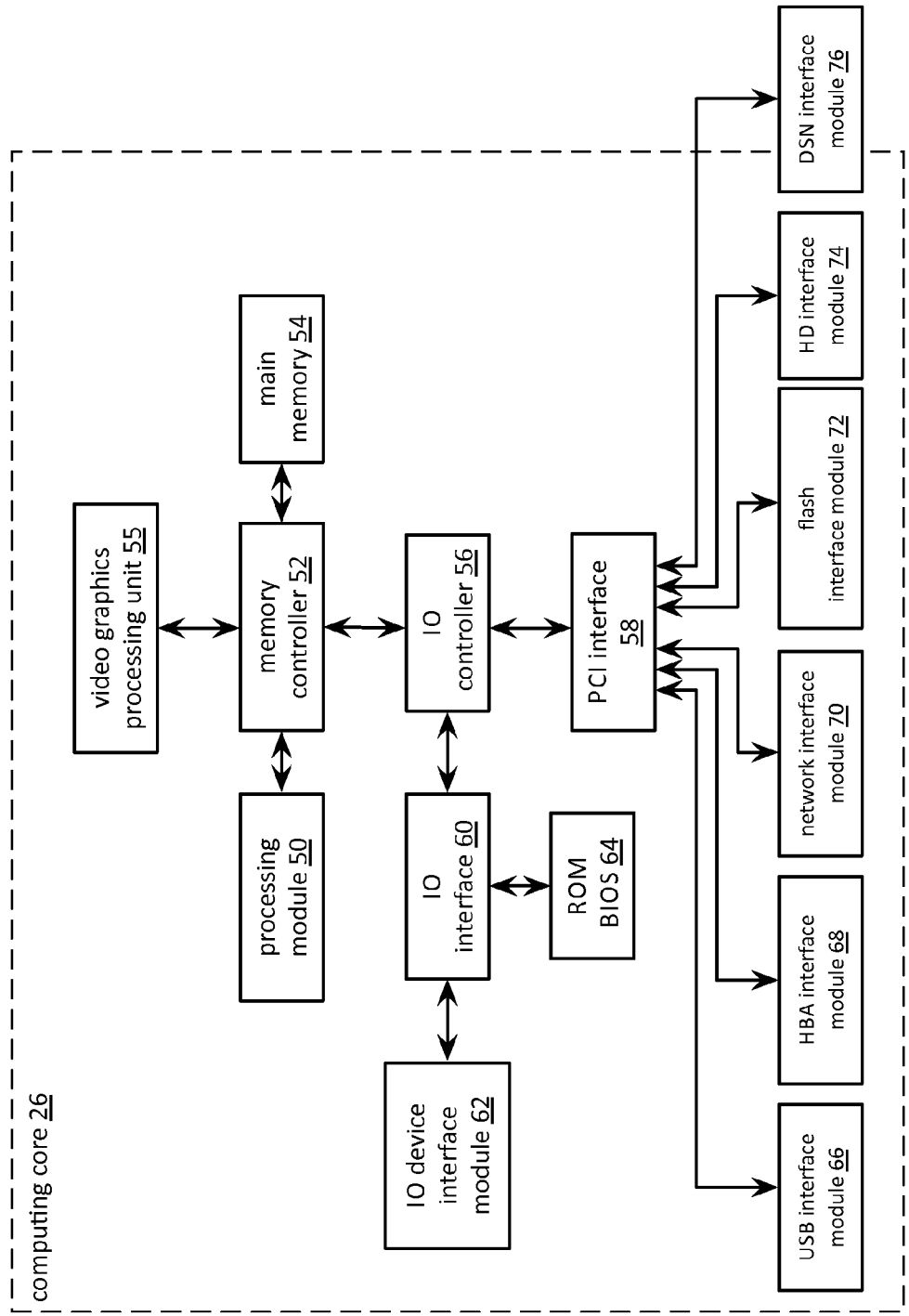
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
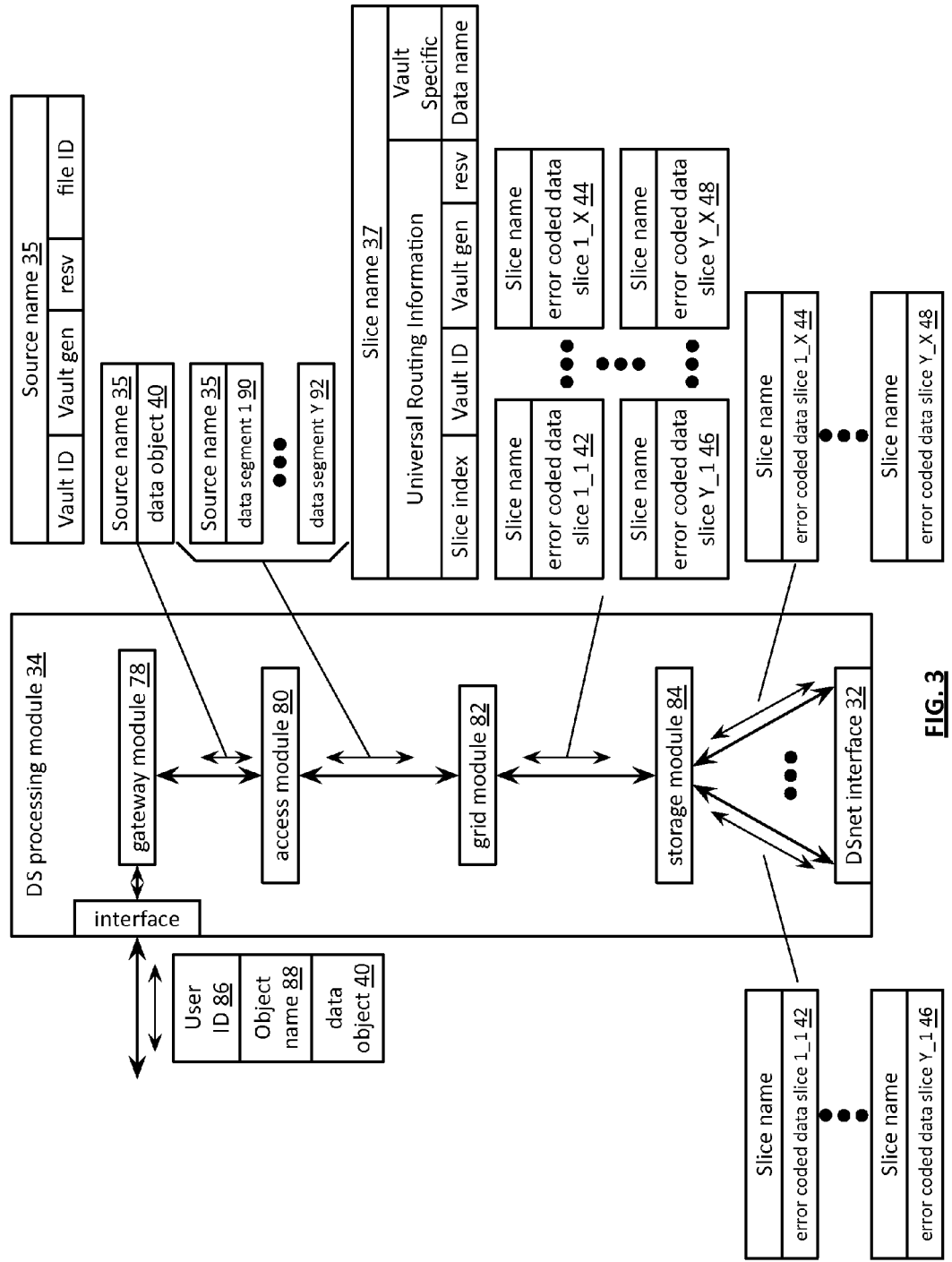
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of U.S. Pat. No. 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of U.S. Pat. No. 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, bytes, data words, etc., but may include more or less bits, bytes, data words, etc. The slicer 79 disperses the bits of the encoded data segment 94 across the EC data slices in a pattern as shown. As such, each EC data slice does not include consecutive bits, bytes, data words, etc. of the data segment 94 reducing the impact of consecutive bit, byte, data word, etc. failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
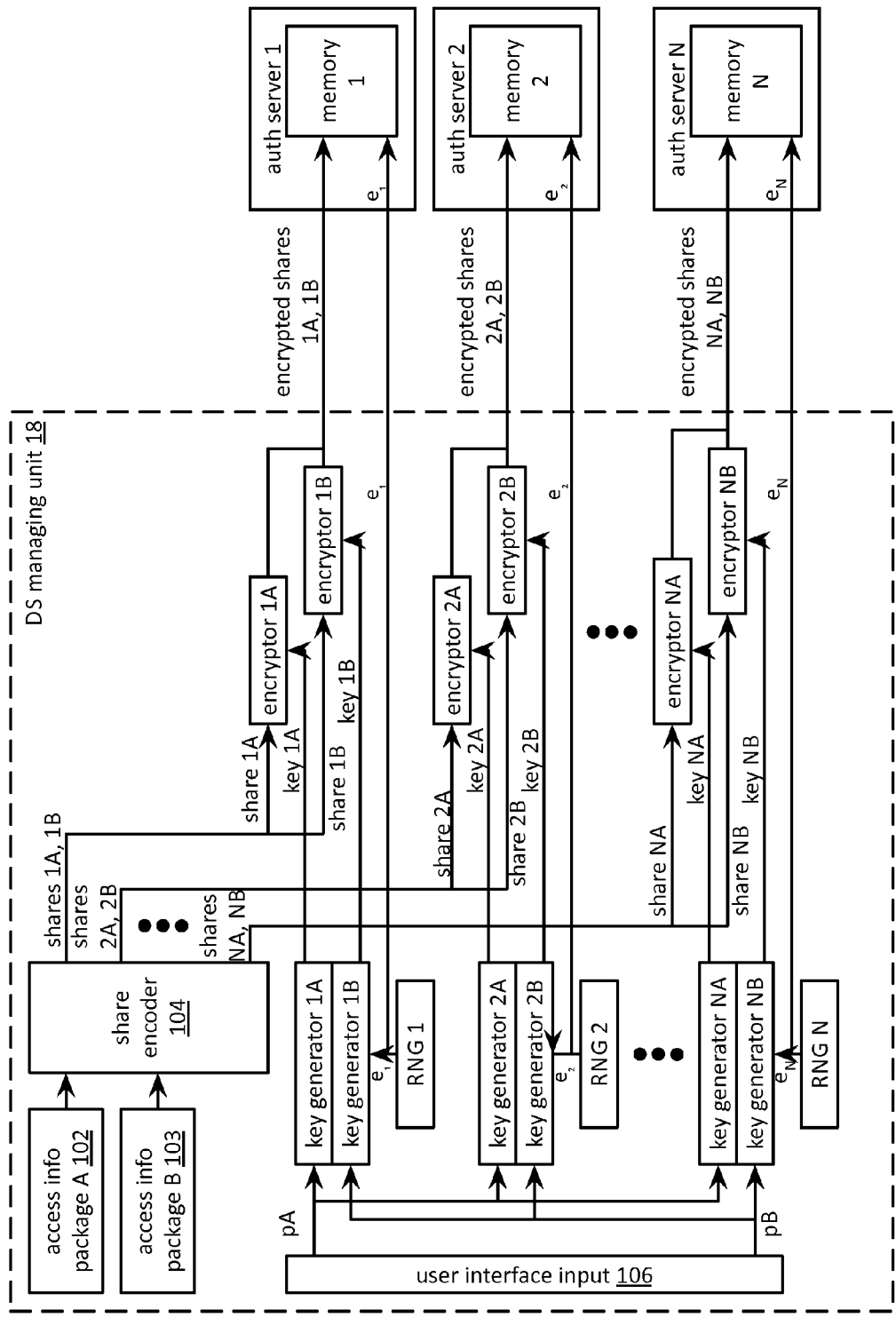
FIG. 6 is a schematic block diagram of dispersed credential storage system in accordance with the present invention.

FIG. 6 is a schematic block diagram of a dispersed credential storage system that includes a dispersed storage (DS) managing unit 18 and a set of authentication servers 1-N. Each authentication server of the set of authentication servers 1-N includes a memory of a set of memories 1-N that is utilized to store a set of random numbers $e_1$-$e_N$ and to store two or more encrypted share sets 1A-NA, 1B-NB. At least one authentication server of the set of authentication servers 1-N may be implemented utilizing at least one of a DS processing unit 16 and a DS unit 36.

The DS managing unit 18 includes at least two access information packages A-B 102-103, a share encoder 104, a plurality of random number generators (RNG) 1-N, two or more sets of key generators 1A-NA, 1B-NB, a user interface input 106, and two or more sets of encryptors 1A-NA, 1B-NB. Each access information package 102-103 includes access information and access information integrity information. The access information integrity information may be generated by utilizing a deterministic function on the access information (e.g., a hashing function). The access information integrity information may be utilized in a subsequent integrity verification step to verify that the access information is valid.

The access information of each access information package 102-103 may include one or more of a user device identifier (ID), a communications path identifier, a wireless channel identifier, a communications system talk group identifier, an encryption key, a public key, a private key, a public/private key pair, a credential, a signature, a signed certificate, a certificate chain, access permissions, authentication information, and access privileges. The two or more access information packages 102-103 may be associated with a common user device, wherein at least one of the two or more access information packages 102-103 may be utilized by the common user device to gain access to a system (e.g., an information system, a data storage system, a communication system, a control system, a computing system, etc.).

Gaining access to the system may include one or more of establishing a connection, authenticating, obtaining registry information, receiving content from the system, sending content to the system, deleting content from the system, receiving a communication, requesting resource assignment, and sending a communication. For example, a first wireless user device facilitates retrieving (e.g., by entering a password A into the user interface input) the encrypted shares 1A-NA, 1B-NB from the set of authentication servers 1-N, facilitates retrieving the random numbers $e_1$-$e_N$ from the authentication servers, facilitates utilizing the encrypted shares 1A-NA, 1B-NB and the random numbers $e_1$-$e_N$ to reproduce the access information package A 102, and utilizes a signature of the access information package A 102 to gain access to a wireless system. Access information package B 103 is not reproduced since password B was not provided.

In a system access example, the first information access package A 102 (e.g., when password A is provided to the user interface input 106) enables access to an entire database containing confidential information and the second information access package B (e.g., when password B is provided to the user interface input) enables access to a non-confidential subset of the entire database. As another system access example, the first information access package A 102 enables access to the entire database containing confidential information and the second information access package B enables access to a fake database and generates a duress access alert. Providing one password may result in reproduction of one access information package of the two or more access information packages 102-103. The method to utilize a password of two or more passwords, the two or more encrypted shares sets 1A-NA, 1B-NB and the random numbers $e_1$-$e_N$ to gain access to the system is discussed in more detail with reference to FIGS. 8-9B.

The share encoder 104 encodes the two or more access information packages 102-103 in accordance with a share encoding function to produce the two or more sets of encoded shares 1A-NA, 1B-NB. The share encoding function 104 includes at least one of a dispersed storage error encoding function and a secret sharing function (e.g., a Shamir secret sharing algorithm). For example, the share encoder 104 encodes access information package B 103 utilizing the Shamir secret sharing algorithm to produce the encoded shares set 1B-NB. As another example, the share encoder 104 encodes access information package A 102 utilizing the dispersed storage error encoding function to produce the encoded shares set 1A-NA.

The two or more sets of encryptors 1A-NA, 1B-NB encrypt the two or more sets of encoded shares 1A-NA, 1B-NB in accordance with an encryption algorithm utilizing two or more sets of keys 1A-NA, 1B-NB to produce the two or more encrypted share sets 1A-NA, 1B-NB. For example, encryptors set 1A-NA encrypts the encoded share set 1A-NA utilizing key set 1A-NA to produce encrypted share set 1A-NA. Generation of the two or more sets of keys 1A-NA, 1B-NB is discussed in greater detail below. The encryption algorithm may be in accordance with dispersed storage error coding parameters. For example, each of the encryptors 1A-NA, 1B-NB utilize a common encryption algorithm in accordance with the dispersed storage error coding parameters. As another example, at least two encryptors of the two or more sets of encryptors 1A-NA, 1B-NB utilize different encryption algorithms in accordance with the dispersed storage error coding parameters.

The two or more sets of encryptors 1A-NA, 1B-NB output the two or more encrypted share sets 1A-NA, 1B-NB to the set of authentication servers 1-N for storage therein. For example, encryptor 1A outputs encrypted share 1A to authentication server 1 and encryptor 1B outputs encrypted share 1B to authentication server 1. Alternatively, an encryptor of the two or more sets of encryptors 1A-NA, 1B-NB outputs an encrypted share to at least one DS processing unit 16, wherein the DS processing unit 16 dispersed storage error encodes the encrypted share to produce at least one set of encrypted share slices and stores the at least one set of encrypted share slices in a dispersed storage network (DSN) memory 22. Alternatively, the encryptor of the two or more sets of encryptors 1A-NA, 1B-NB outputs the encrypted share to the DSN memory for storage therein (e.g., without producing the at least one set of encrypted share slices).

The user interface input 106 receives each password of two or more passwords (e.g., via a keypad) pA, pB from a user or indirectly receives each password from a user (e.g., via retrieving and/or receiving). The password includes one or more of a text string, at least one of a user device identifier (ID), a user ID, a personal information number (PIN), a badge ID, a district ID, a work-shift ID, an assignment ID, a mission ID, a passcode, a password, a picture file, a video file, an audio file, a retinal scan, a facial scan, a fingerprint scan, a personal secret, a password index number, and any other values that can be subsequently provided by a user of a user device. For example, the user interface input 106 directly receives a password and a PIN from a keyboard input as the password. As another example, the user interface input 106 indirectly receives the password by receiving the password from a user registration server, wherein the password was generated when an associated user was added to a registration database within the user registration server.

The set of random number generators 1-N generate the set of random numbers $e_1$-$e_N$. For example, each random number of the random numbers $e_1$-$e_N$ are a same number of bits as a number of bits of p, where p is determined by security parameters (e.g., of dispersed storage error coding parameters). The set of random number generators 1-N output the set of random numbers $e_1$-$e_N$ to the set of authentication servers 1-N. Each authentication server of the set of authentication servers 1-N stores a corresponding random number of the set of random numbers $e_1$-$e_N$ in a corresponding memory of the set of memories 1-N. Alternatively, a DS processing module 34 or DS processing unit 16 associated with each authentication server or with the DS managing unit 18 dispersed storage error encodes each random number of the set of random numbers $e_1$-$e_N$ in accordance with the dispersed storage error coding parameters to produce at least N sets of encoded random number slices. Next, the DS processing module 34 sends the corresponding at least N sets of encoded random number slices to the DSN memory 22 for storage therein.

The two or more sets of key generators 1A-NA, 1B-NB generate the two or more sets of keys 1A-NA, 1B-NB based the set of random numbers $e_1$-$e_N$ and the security parameters. Each key of the two or more sets of keys 1A-NA, 1B-NB includes a same number of bits as a number of bits of p. For example, the key generator set 1A-NA generates the key set 1A-NA by transforming an expansion of the password pA utilizing a mask generating function (MGF) and the random numbers $e_1$-$e_N$ in accordance with an expression: key $x = ((MGF(PA))^2)^{e_x}$ modulo p. For example, key $1A = ((MGF(pA))^2)^{e_1}$ modulo p. In an instance, key generator 1A generates key 1A=13 when MGF(pA)=4, $e_1$=10, and p=23, since $(4^2)^{10}$ mod 23=13. Alternatively, or in addition to, the key generator may process the key to provide a key of a desired length in relation to an encryption algorithm. For example, the key output of the algorithm is hashed to produce a hashed key and a desired number of bits (e.g., 256, 192, 128 bits) of the hashed key are utilized as a key for the encryption algorithm. As another example, the key generator set 1B-NB generates the key set 1B-NB by transforming an expansion of the password pB utilizing a mask generating function (MGF) and the random numbers $e_1$-$e_N$ in accordance with an expression: key $y = ((MGF(pB))^2)^{e_y}$ modulo p. The method of operation of the DS managing unit 18 to store the access information packages 102-103 is discussed in greater detail with reference to FIG. 7.

A password of the two or more passwords pA, pB, a decode threshold number of pairs of random numbers $e_x$ and corresponding encrypted shares are required to subsequently reproduce one access information package of the two or more access information packages 102-103. The method to reproduce the access information package is discussed in greater detail with reference to FIGS. 8-9B. A security improvement may be provided by the system when the pairs of random numbers $e_x$ and encrypted shares are stored on substantially different authentication servers and/or via two or more DS processing units 16 and two or more DSN memories 22 by reducing the likelihood of a successful attack to gain access to the pairs of random numbers $e_x$ and encrypted shares. A further security improvement may be provided by utilizing two or more passwords to constrain access in a duress scenario.

Figure 7:
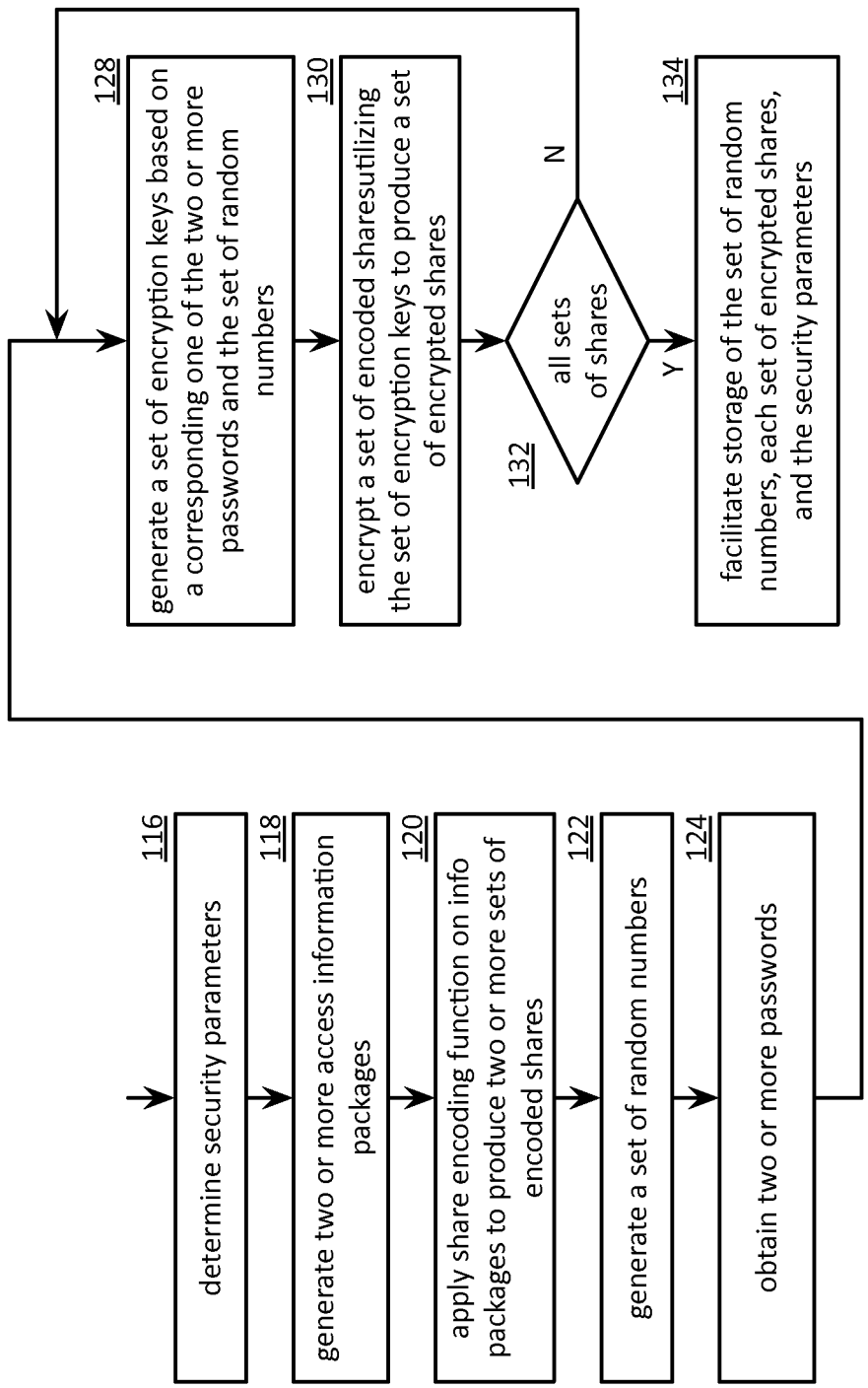
FIG. 7 is a flowchart illustrating an example of storing access information in accordance with the present invention.

FIG. 7 is a flowchart illustrating an example of storing access information. The method begins with step 116 where a processing module (e.g., of a dispersed storage (DS) managing unit) determines security parameters to be utilized in storing two or more access information packages. The security parameters may include one or more of a share number N, a value of security algorithm constant p (a prime number), a value of security algorithm constant q (a prime number), one or more shared secret algorithm parameters, an encryption algorithm indicator, a key generator function indicator, a key size, a random number generator function, a random number size, a hash function type indicator, a security package structure indicator, and any other parameter to specify the operation of the storing of the two or more access information packages. The determination may be based on one or more of security requirements, a security status indicator, a user identifier (ID), a vault ID, a list, a table lookup, a predetermination, a message, and a command. For example, the processing module determines the security parameters based on a table lookup corresponding to a user ID affiliated with a user device associated with at least one access information package.

The method continues at step 118 where the processing module generates the two or more access information packages. For example, the processing module generates a hash digest of a signature that enables full database access and bundles the hash digest with the signature to create a first access information package. As another example, the processing module generates a hash digest of a second signature that enables limited database access and bundles the hash digest of the second signature with the second signature to create a second access information package.

The method continues at step 120 where the processing module applies a share encoding function on each access information package to produce two or more sets of encoded shares. The share encoding function includes at least one of a dispersed storage error encoding function and a secret sharing function (e.g., Shamir's secret sharing scheme, Blakley's scheme, Chinese Remainder Theorem scheme). For example, the processing module produces a first set of encoded shares from the first access information package in accordance with shared secret algorithm parameters when the share encoding function is the secret sharing function. As another example, the processing module dispersed storage error encodes the second access information package in accordance with an error coding dispersal storage function to produce a second set of encoded shares (e.g., as encoded share slices) when the share encoding function is the dispersed storage error encoding function.

The method continues at step 122 where the processing module generates a set of random numbers. The generating includes obtaining a plurality of base random numbers and expanding each base random number of the plurality of base random numbers based on the security parameters to produce the plurality of random numbers. For example, the processing module produces a random number $e_x$ utilizing a random number generator function such that the bit length of the random number $e_x$ is substantially the same as a bit length of a value of security algorithm constant p and/or a bit length of a value of security algorithm constant q. For instance, the processing module produces a random number $e_3$ that is 1,024 bits in length when the security algorithm constant p is 1,024 bits in length.

The method continues at step 124 where the processing module obtains two or more passwords. The obtaining may be based on one or more of a user device query, registration information, a lookup, a user device input, a DS managing unit input, a DS managing unit lookup, a message, a token device query, and a command. For example, the processing module obtains a first password of the two or more passwords via a query to an associated user device. As another example, the processing module performs a badge ID table lookup to obtain a second password of the two or more passwords.

The method continues at step 128 where the processing module generates a set of encryption keys based on a corresponding one of the two or more passwords and the set of random numbers. The generating includes transforming the corresponding one of the two or more passwords utilizing a mask generating function (MGF), security parameters, and the set of random numbers. For example, the processing module generates a key x based on password pZ of the two or more passwords and corresponding random number $e_x$ in accordance with the expression key $x=((MGF(pZ))^2)^{e_x}$ modulo p.

The method continues at step 130 where the processing module encrypts a set of encoded shares of the two or more sets of encoded shares utilizing the set of encryption keys in accordance with an encryption algorithm to produce a set of encrypted shares. The encryption may be based on one or more of the security parameters, the dispersed storage error coding parameters, a user identifier (ID), a vault ID, a vault lookup, security requirements, a security status indicator, a message, and a command.

The method continues at step 132 where the processing module determines whether all sets of encoded shares have been encrypted. The determination may be based on comparing a number of sets of encrypted shares produced so far to a value of a number of passwords. The method repeats back to step 128 when the processing module determines that all sets of encoded shares have not been encrypted. The method continues to step 134 when the processing module determines that all sets of encoded shares have been encrypted.

The method continues at step 134 where the processing module facilitates storage of the set of random numbers, each set of encrypted shares, and the security parameters. The facilitating includes at least one sending the set of random numbers, each set of encrypted shares, and the security parameters to a set of authentication servers for storage therein, sending a corresponding user device addressing information of the set of authentication servers, sending the corresponding user device access information pertaining to the set of authentication servers to utilize in subsequent access of the set of random numbers, each set of encrypted shares, and the security parameters from the authentication servers, sending the set of random numbers, each set of encrypted shares, and the security parameters to a dispersed storage (DS) processing unit, and dispersed storage error encoding at least one of the set of random numbers, each set of encrypted shares, and the security parameters to produce encoded slices and outputting the encoded slices to a dispersed storage network (DSN) memory for storage therein.

Figure 8:
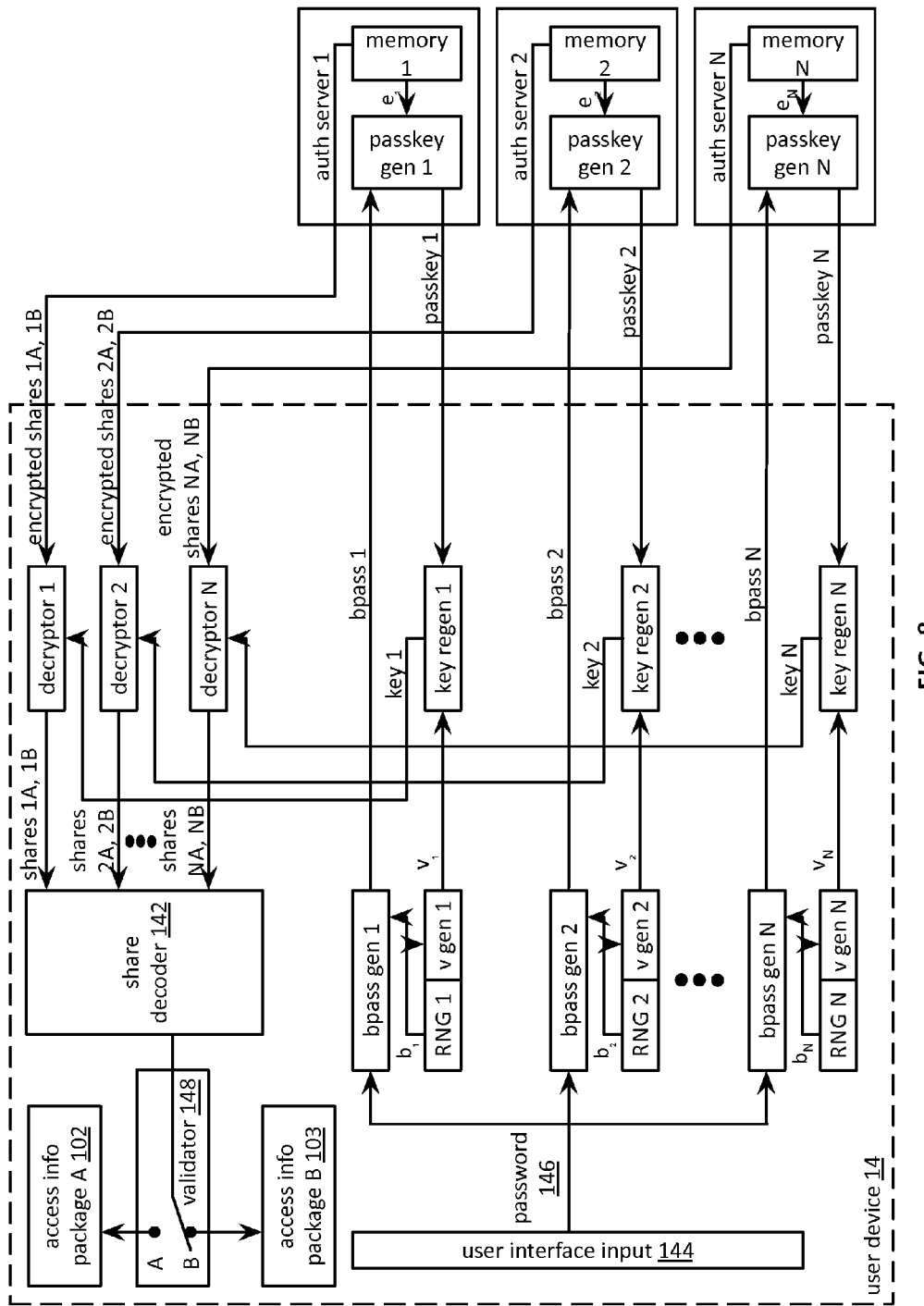
FIG. 8 is a schematic block diagram of dispersed credential retrieval system in accordance with the present invention.

FIG. 8 is a schematic block diagram of a dispersed credential retrieval system that includes a user device 14 and a set of authentication servers 1-N. Each authentication server of the set of authentication servers 1-N includes a memory of a set of memories 1-N that is utilized to retrieve a set of random numbers $e_1$-$e_N$ and is utilized to retrieve at least two sets of encrypted shares 1A-NA, 1B-NB and a passkey generator of a set of passkey generators 1-N to provide a set of passkeys 1-N. At least one authentication server of the set of authentication servers 1-N may be implemented utilizing at least one dispersed storage (DS) processing unit 16 and a dispersed storage network (DSN) memory 22. The user device 14 includes two or more access information packages A, B 102-103, a share decoder 142, a user interface input 144, a set of random number generators (RNG) 1-N, a set of blinded password generators 1-N (e.g., bpass gen 1-N), a set of value generators (e.g., v gen 1-N), a set of key regenerators (e.g., key regen 1-N), a validator 148, and a set of decryptors 1-N.

The two or more access information packages 102-103 includes access information recovered as described below and access information integrity information. The access information integrity information may be generated by utilizing a deterministic function on recovered access information. To recover access information, the user interface input 144 receives at least one password 146 of two or more passwords 146 (e.g., received from a keypad of the user device 14). The set of random number generators 1-N generate a set of blinded random numbers $b_1$-$b_N$. For example, each random number generator of the random number generators 1-N generates a blinded random number of the set of blinded random numbers $b_1$-$b_N$ such that each blinded random number includes a same number of bits as a number of bits of p, wherein p is extracted from dispersed storage error coding parameters and/or security parameters retrieved from the memory. The set of random number generators 1-N send the set of blinded random numbers $b_1$-$b_N$ to the set of blinded password generators 1-N and to the set of value generators 1-N.

The set of blinded password generators 1-N generate a set of blinded passwords (bpass) 1-N based on the security parameters, the set of blinded random numbers $b_1$-$b_N$, and the password of the two or more passwords. The set of blinded passwords 1-N are generated such that each blinded password 1-N includes a same number of bits as a number of bits of security parameter p. For example, the set of blinded password generators 1-N generate the set of bpass 1-N values by transforming an expansion of a first password pA of the two or more passwords 146 into the same number of bits as the security parameter constant p utilizing a mask generating function (MGF) and a corresponding one of the set of blinded random numbers $b_1$-$b_N$ in accordance with the expression bpass $x=((MGF(pA))^2)^b{}_x$ modulo p. For example, bpass $1=((MGF(pA))^2)^b{}_1$ modulo p. In an instance, blinded password generator 1 generates bpass 1=18 when MGF(pA)=4, $b_1$=7, and p=23, since $(4^2)^7$ mod 23=18. The set of blinded password generators 1-N send the set of bpass 1-N values to the set of authentication servers 1-N.

The set of value generators 1-N generate a set of values $v_1$-$v_N$ based on the set of blinded random numbers $b_1$-$b_N$ and the value of a security parameters constant q in accordance with an expression b*v modulo q=1. The value of q is based on a value of p in accordance with the expression q=(p−1)/2. For example, q=11 when p=23. For instance, value generator 1 generates a value v1=8 when $b_1$=7 and q=11 since 7*8=56 and 56 modulo 11=1. The set of value generators 1-N send the set of values $v_1$ through $v_N$ to the set of key regenerators 1-N.

Each passkey generator of the set of passkey generators 1-N retrieves a previously stored random number value of a set of random number values $e_1$ through $e_N$ from a memory of a set of memories 1-N to produce a recovered random number of a set recovered random numbers $e_1$ through $e_N$ in response to receiving a passkey request from the user device 14 that includes an associated blinded password (bpass) of the set of blinded passwords 1-N. The set of passkey generators 1-N generate a set of passkeys 1-N based on the set of recovered random numbers $e_1$ through $e_N$ and the set of bpass 1-N values in accordance with an expression passkey $x=(\text{bpass } x)^e{}_x$ modulo p. For example, passkey generator 1 generates a passkey 1=9 when bpass 1=18, $e_1$=10, and p=23 since $(18)^{10}$ modulo 23=9.

The user device 14 receives the set of passkeys 1-N and forwards the set of passkeys 1-N to the set of key regenerators 1-N. The key regenerators 1-N receive the passkeys 1-N and regenerates a set of keys 1-N based on the set of passkeys 1-N and the set of values $v_1$ through $v_N$ in accordance with an expression key $x=(\text{passkey } x)^v{}_x$ modulo p. For example, key regenerator 1 regenerates key 1 such that key 1=13 when passkey 1=9, v1=8, and p=23 since $(9)^8$ modulo 23=13. The set of key regenerators 1-N send the set of keys 1-N to the decryptors 1-N.

The set of decryptors 1-N retrieves the at least two sets of encrypted shares 1A-NA, 1B-NB from the set of authentication servers 1-N. Alternatively, the set of decryptors 1-N facilitates retrieving one or more sets of encoded encrypted share slices from the DSN memory 22 and decoding the one or more sets of encoded encrypted share slices to reproduce the at least two sets of encrypted shares 1A-NA, 1B-NB. The decryptors 1-N decrypt each set of the at least two sets of encrypted shares 1A-NA, 1B-NB utilizing keys 1-N in accordance with a decryption algorithm to produce at least two sets of encoded shares 1A-NA, 1B-NB. The decryptors 1-N send the at least two sets of encoded shares 1A-NA, 1B-NB to the share decoder 142.

The share decoder 142 decodes at least a decode threshold number of each of the at least two sets of encoded shares 1A-NA, 1B-NB to reproduce two or more non-validated access information packages. The decoding may include at least one of dispersed storage error decoding encoded shares to reproduce a non-validated access information package and decoding the encoded shares utilizing a secret sharing function to reproduce the non-validated access information package. For example, the share decoder 142 decodes a set of encoded shares utilizing a Shamir secret sharing algorithm to produce a non-validated access information package A. As another example, the share decoder 142 decodes at least the decode threshold number of encoded shares 1-N in accordance with an error coding dispersal storage function to produce a non-validated access information package B.

The validator 148 generates a calculated access information integrity information based on non-validated access information and validates a non-validated access information package when the calculated access information is substantially the same as retrieved access information integrity information extracted from the non-validated access information package. The validator 148 selects one of the retrieved two or more access information packages 102-103 as a valid access information package and stores the one of the retrieved two or more access information packages 102-103 in a corresponding validated access information package storage location. For example, the validator saves retrieved access information package A 102 and discards retrieved access information package B 103 when the validator validates access information package A. The method to retrieve the two or more access information packages 102-103 is discussed in greater detail with reference to FIGS. 9A-9B.

Figure 9A:
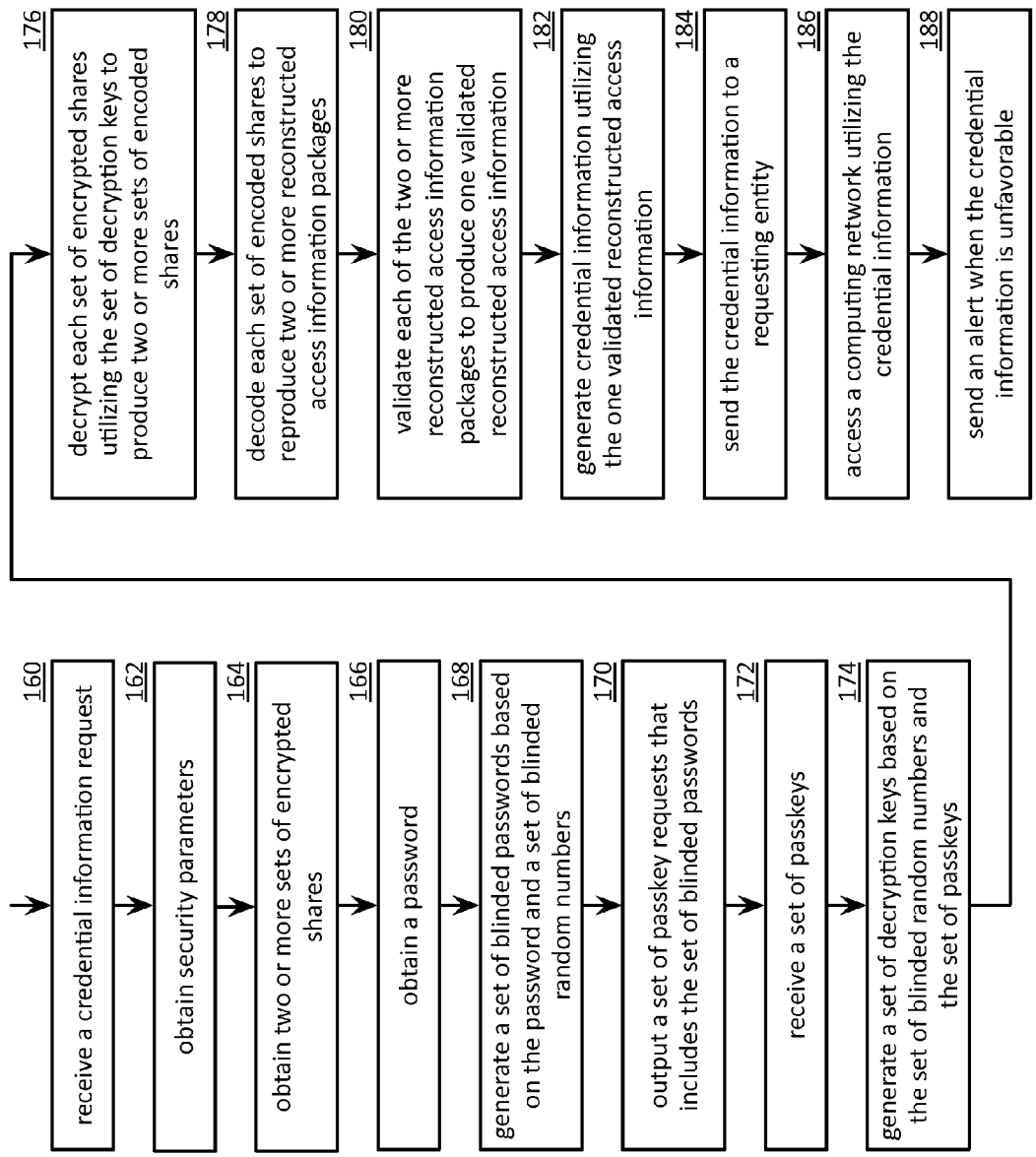
FIG. 9A is a flowchart illustrating an example of retrieving access information in accordance with the present invention.

FIG. 9A is a flowchart illustrating an example of retrieving access information. The method begins at step 160 where a processing module (e.g., of a user device) receives a credential information request (e.g., from a user device process). The request includes at least one of a credential information request opcode, a credential information type indicator (e.g., a signing request, a key request, network access information request, access privileges request), and a certificate.

The method continues at step 162 where the processing module obtains security parameters. The security parameters may include one or more of a share number N, a value of security algorithm constant p (a prime number), a value of security algorithm constant q (a prime number), one or more shared secret algorithm parameters, an encryption algorithm indicator, a key generator function indicator, a key size, a random number generator function, a random number size, a hash function type indicator, a security package structure indicator, a number of passwords, and any other parameter to specify the operation of the storing of the access information package data. The obtaining may be based on one or more of retrieving the security parameters from a local memory, sending a query to a dispersed storage (DS) managing unit, and determining based on one or more of security requirements, a security status indicator, a user identifier (ID), a vault ID, a list, a table lookup, a predetermination, a message, and a command. For example, the processing module determines the security parameters based on a table lookup within a local memory corresponding requesting entity of the credential information request.

The method continues at step 164 where the processing module obtains two or more sets of encrypted shares. The obtaining includes at least one of retrieving the encrypted shares from a local memory (e.g., of the token device), retrieving the encrypted shares from a set of authentication servers, retrieving encrypted share slices from a dispersed storage network (DSN) memory and decoding the encrypted share slices to reproduce the set of encrypted shares. The method continues at step 166 where the processing module obtains a password of two or more passwords. The obtaining includes at least one of receiving the password from a user device input, retrieving the password from a memory, and receiving the password.

The method continues at step 168 where the processing module generates a set of blinded passwords based on the password and a set of blinded random numbers. The generating includes for each blinded random number of the set of blinded random numbers, transforming the password utilizing a mask generating function and the blinded random number to produce a blinded password of the set of blinded passwords. For example, the processing module generates a blinded password x based on a password pZ and a corresponding blinded random number $b_x$ in accordance with an expression blinded password $x=((MGF(PZ))^2)^{b_x}$ modulo p. The processing module generates the set of blinded random numbers by obtaining a set of base random numbers and expanding each base random number of the set of base random numbers based on security parameters to produce the set of blinded random numbers. For example, the processing module produces a blinded random number $b_x$ utilizing a random number generator function such that a bit length of the blinded random number $b_x$ is substantially the same as a bit length of one of a value of a security algorithm constant p and a bit length of a value of a security algorithm constant q. For instance, the processing module produces a blinded random number $b_3$ that is 1,024 bits in length when the security algorithm constant p is 1,024 bits in length.

The method continues at step 170 where the processing module outputs a set of passkey requests to a set of authentication servers that includes the set of blinded passwords. The method continues at step 172 where the processing module receives a set of passkeys (e.g., from the user device). The method continues at step 174 where the processing module generates a set of decryption keys based on the set of blinded random numbers and the set of passkeys. The generating of the set of decryption keys includes generating a set of values based on the set of blinded random numbers and generating the set of decryption keys based on the set of values and the set of passkeys. The generating the set of values includes transforming the set of blinded random numbers utilizing a modulo function based on security parameters to produce the set of values. The generating the set of decryption keys based on the set of values and the set of passkeys includes transforming the passkey utilizing a modulo function based on security parameters and a corresponding value of the set of values to produce a decryption key of the set of decryption keys for each passkey of the set of passkeys. For example, the processing module generates a value $v_x$ of the set of values based on a blinded random number $b_x$ in accordance with the expression b*v modulo q=1, wherein q is a security constant of security parameters such that q=(p-1)/2. For instance, $v=b^{(q-2)}$ mod q, when q is prime (e.g., 8=7^9 mod 11, 8*7 mod 11=1). The processing module generates a decryption key x based on a value $v_x$ and passkey x in accordance with an expression decryption key $x=(passkey\ x)^{v_x}$ modulo p.

The method continues at step 176 where the processing module decrypts each set of the two or more sets of encrypted shares utilizing the set of decryption keys to produce two or more sets of encoded shares. The decryption is in accordance with a decryption algorithm and may be based on one or more of the security parameters, error coding dispersal storage function parameters, a user ID, a vault ID, a vault lookup, security requirements, a security status indicator, a message, and a command. The method continues at step 178 where the processing module decodes the two or more sets of encoded shares to reproduce two or more reconstructed access information packages. The decoding includes at least one of dispersed storage error decoding each set of encoded shares to produce each access information package and decoding each set of encoded shares utilizing a secret sharing function to reproduce the two or more reconstructed access information packages.

The method continues at step 180 where the processing module validates each of the two or more reconstructed access information packages to produce one validated reconstructed access information package. The validating includes comparing a calculated hash of access information of each reconstructed access information package to a retrieved access information hash digest of the reconstructed access information package. For example, the processing module determines that a first reconstructed access information package is valid when a comparison indicates that the calculated hash of the reconstructed access information is substantially the same as the retrieved access information hash digest.

The method continues at step 182 where the processing module generates credential information utilizing the one validated reconstructed access information package. For example, the processing module generates the credential information as a signature of a received certificate based on receiving a signing request credential information type indicator of the credential information request. The method continues at step 184 where the processing module sends the credential information to a requesting entity (e.g., to the user device process).

The method continues at step 186 where the processing module accesses a computing network utilizing the credential information. For example, the processing module sends a signature associated with the one validated reconstructed access information package to the computing network. In an instance, full access is granted by the computing network on receiving a signature associated with a non-duress scenario (e.g., a user entered a normal non-duress password). In another instance, limited access to fake information is granted by the computing network on receiving a signature associated with a duress scenario (e.g., a user entered a duress password). The method continues at step 188 where the processing module sends an alert when the credential information is unfavorable (e.g., an unfavorable flag is set in the one validated reconstructed access information package). The alert may indicate a duress scenario. The processing module sends the alert by outputting the alert to one or more of a second user device, a group of user devices, a security officer device, and a DS managing unit.

Figure 9B:
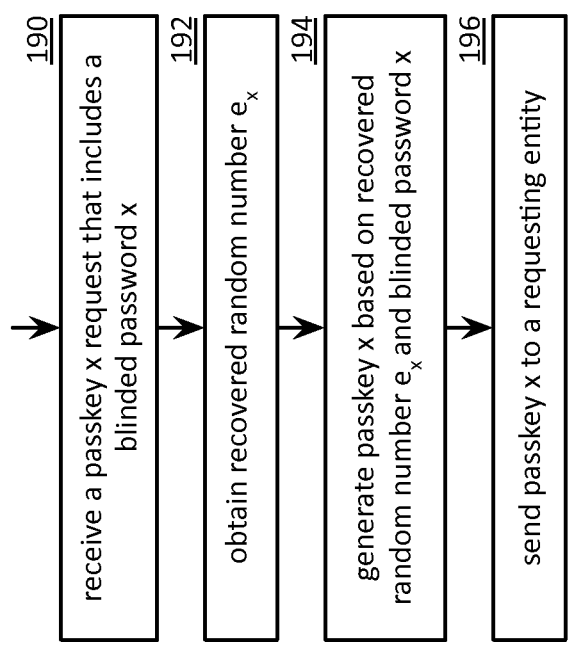
FIG. 9B is a flowchart illustrating an example of generating a passkey in accordance with the present invention.

FIG. 9B is a flowchart illustrating an example of generating a passkey. The method begins at step 190 where a processing module (e.g., of an authentication server) receives a passkey x retrieval request, wherein the request includes at least one of, a user identifier (ID), a vault ID, a source name, one or more slice names, a random number identifier (e.g., a data object name, a block number, a source name, a directory identifier, etc.), and at least one blinded password x of a set of blinded passwords. For example, the processing module receives a passkey x request from a user device, wherein the request includes a blinded password x and a data object name affiliated with an associated stored random number $e_x$.

The method continues at step 192 where the processing module obtains one or more recovered random numbers of a set of recovered random numbers. The obtaining includes at least one of retrieving the recovered random number from a memory and retrieving at least a decode threshold number of stored random number slices and decoding the decode threshold number of stored random number slices to produce the recovered random number of the set of recovered random numbers.

The method continues at step 194 where the processing module generates a passkey of the set of passkeys based on a blinded password of the set of blinded passwords and the recovered random number of the set of recovered random numbers. The generating includes transforming the blinded password utilizing a modulo function based on a corresponding recovered random number of the set of recovered random numbers and security parameters to produce a passkey of the set of passkeys for each blinded password of the set of blinded passwords. For example, the processing module generates a passkey x based on a recovered random number $e_x$ and blinded password x in accordance with an expression passkey x=(blinded password x)$^{e_x}$ modulo p. The method continues at step 196 where the processing module outputs the passkey x (e.g., to a requesting entity such as a user device).

The methods described above operate in accordance with mathematical expressions enabling generation of keys utilized to encrypt and decrypt shares of an access information package of data. The mathematical expressions may be further understood in consideration of the following mathematical proof, wherein the proof illustrates that a reproduced key (e.g., to decrypt an encrypted share) is substantially equivalent to an original key (e.g., utilized to encrypt the share to produce the encrypted share).

Proof—Recall that:
b*v=1 mod q and p=2*q+1
This proof will illustrate that:

$$(MGF(password)\char`\^2)\char`\^(b*e*v) \text{ equals } (MGF(password)\char`\^2)\char`\^e \pmod{p}$$

First, replace MGF(password) with X:

$$(X\char`\^2)\char`\^(b*e*v)=(X\char`\^2)\char`\^(e) \pmod{p}$$

Note that:
Since b*v=1 mod q, it follows that: b*v=n*q+1, for some integer n. Note that (b*v)/q=n remainder 1.
Therefore (b*v) can be substituted with (n*q+1) in the above expression yielding:

$$(X\char`\^2)\char`\^((n*q+1)*e) \bmod p$$

Since p=2*q+1, taking p out of the formula, resulting in:

$$(X\char`\^2)\char`\^((n*q+1)*e) \bmod (2*q+1)$$

Since X^2 is raised to a power, simply take X to the power of twice the exponent:

$$X\char`\^(2*(nq+1)*e) \bmod (2q+1)$$

Which may be written as:

$$X\char`\^((2nq+2)*e) \bmod (2q+1)$$

Multiplying both parts by e:

$$X\char`\^(2nqe+2e) \bmod (2q+1)$$

Split these out as so:

$$X\char`\^(2neq)*X\char`\^(2e) \bmod (2q+1)$$

Re-write the first power of X:

$$X\char`\^(2q*ne)*X\char`\^(2e) \bmod (2q+1)$$

Which can also be written as:

$$(X\char`\^(2q))\char`\^(2e)X\char`\^(2e) \bmod (2q+1)$$

Un-doing a the substitution of p for 2q+1, find:

$$(X\char`\^(p-1))\char`\^(2e)*X\char`\^(2e) \bmod p$$

Fermat's Little Theorem shows that for any prime number P, and any integer X, that: X^(P−1)=1 mod P, therefore (X^(p−1)) mod p=1 mod p. This yields:

$$1\char`\^(ne)*X\char`\^(2e) \bmod p$$

Which is the same as:

$$1*X\char`\^(2e) \bmod p$$

Which is this which is the same as the key:

$$(X\char`\^2)\char`\^e \bmod p$$

As a numerical example:
p=23
q=(p−1)/2=11
let e1=10
let [mask generating function (common password)]^2=16
key 1=16^e1 mod 23=13
let b1=7
bpass 1=16^7 mod 23=18
passkey 1=bpass^e1 mod p=18^10 mod 23=9
b*v=1 modulo q
b1*v1=1 mod q
7*v1=1 mod 11 note: 56 mod 11=1 so v1=8
regen key 1=passkey1^v1 modulo p
9^8 mod 23=13, which checks with the 13 calculated above for key 1, which is the key.

FIG. 10A is a flowchart illustrating an example of storing data encryption information. The method begins at step 198 where processing module (e.g., of a user device) generates a public-private key pair in accordance with a public-key cryptography approach. The method continues at step 200 where the processing module stores a public key of the public-private key pair in a local memory (e.g., of the user device). The method continues at step 202 where the processing module facilitates storing a private key of the public-private key pair in a dispersed credential storage system. For example, the processing module generates an access information package that includes the private key, generates a set of encoded shares based on the access information package, obtains a password, encrypts the set of encoded shares based on the password and a set of random numbers to produce a set of encrypted shares, and sends the set of encrypted shares and the set of random numbers to a set of authentication servers utilizing a set of internet protocol (IP) addresses associated with the set of authentication servers. As another example, the processing module sends the password and the private key to a dispersed storage (DS) processing unit for storage of the private key in the dispersed credential storage system.

The method continues at step 204 where the processing module obtains a data encryption key. The obtaining includes at least one of generating the data encryption key based on a random number, retrieving the data encryption key, and receiving the data encryption key. The method continues at step 206 where the processing module encrypts data utilizing the data encryption key to produce encrypted data. The method continues at step 208 of the processing module stores encrypted data in a local memory. For example, the processing module stores the encrypted data in a hard disk drive memory associated with a user device of the processing module.

The method continues at step 210 where the processing module retrieves the public key from the local memory. Alternatively, the processing module receives the public key. The method continues at step 212 where the processing module encrypts the data encryption key utilizing the public key to produce an encrypted data encryption key. The method continues at step 214 where the processing module stores the encrypted data encryption key in the local memory. Alternatively, or in addition to, the processing module stores the encrypted data encryption key in the dispersed credential storage system.

FIG. 10B is a flowchart illustrating an example of retrieving data encryption information. The method begins at step 216 where a processing module (e.g., of a user device) facilitates retrieving a private key of a public-private key pair from a dispersed credential storage system. For example, the processing module obtains a password, generates a set of blinded passwords based on the password and a set of random numbers, sends a set of passkey requests that includes the set of blinded passwords to a set of authentication servers utilizing a set of internet protocol (IP) addresses associated with the authentication servers, receives a set of passkeys, generates a set of keys based on the set of passkeys and the set of random numbers, retrieves a set of encrypted shares from a set of authentication servers, decrypts the set of encrypted shares utilizing the set of keys to produce a set of encoded shares, decodes the set of encoded shares to produce an access information package, validates the access information package, and extracts the private key from the validated access information package. Alternatively, the processing module generates a private key retrieval request that includes the password and sends the request to a dispersed storage (DS) processing unit of the dispersed credential storage system.

The method continues at step 218 where the processing module retrieves an encrypted data encryption key from a local memory, wherein the encrypted data encryption key is associated with encrypted data to be decrypted. The method continues at September 20 where the processing module decrypts the encrypted data encryption key utilizing the private key to reproduce a data encryption key. The method continues at step 222 where the processing module retrieves the encrypted data from the local memory. For example, the processing module retrieves the encrypted data from a hard disk memory of a user device associated with the processing module. The method continues at step 224 where the processing module decrypts the encrypted data utilizing the data encryption key to reproduce data.

Figure 11A:
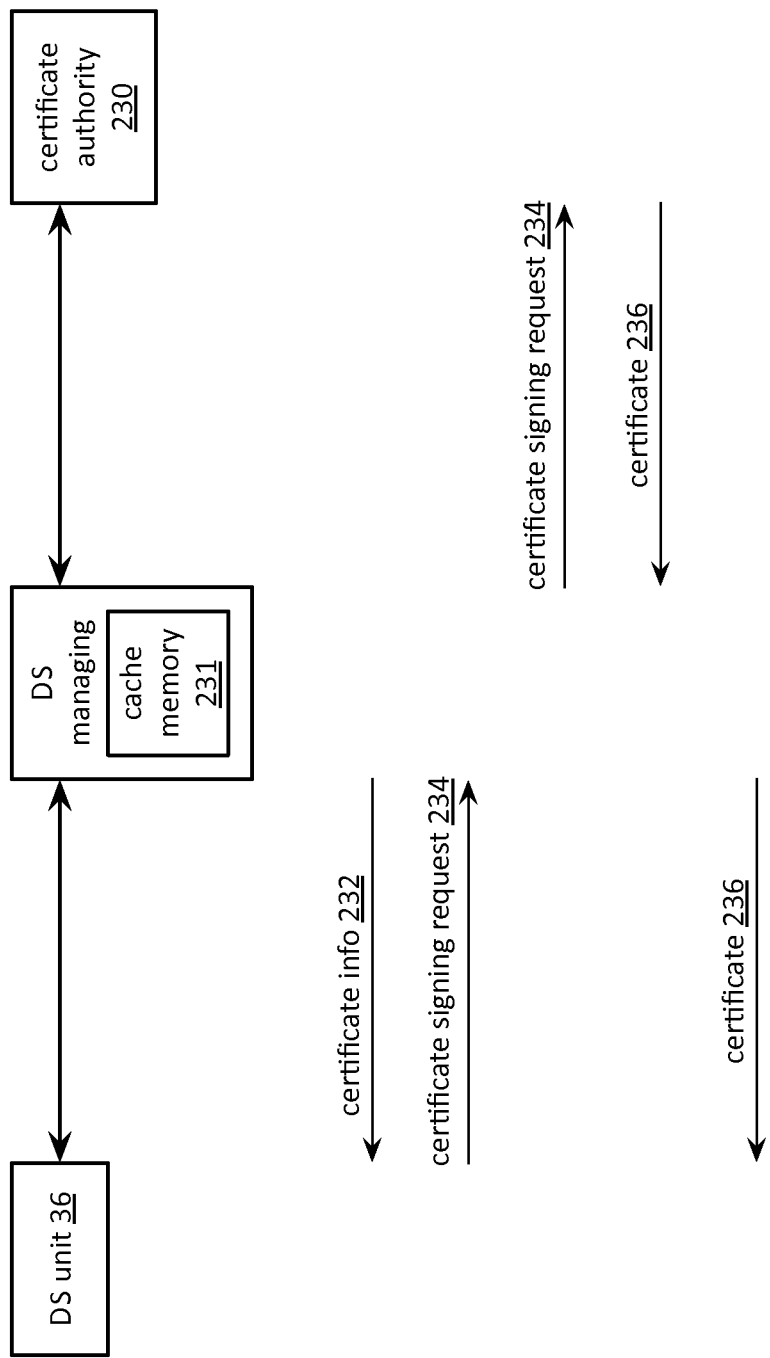
FIG. 11A is a diagram illustrating an example of a digital certificate acquisition system sequence in accordance with the present invention.

FIG. 11A is a diagram illustrating an example of a digital certificate acquisition system sequence. The system includes a dispersed storage (DS) unit 36, a DS managing unit 18, and a certificate authority (CA) 230. Alternatively, the DS unit 36 may be implemented by any other unit, device, or module of a dispersed storage network (DSN), the DS managing unit 18 may be implemented by the certificate authority 230, and the certificate authority 230 may be implemented within a DS managing unit 18. The DS managing unit 18 includes cache memory 231 for temporarily storing certificate information 232. Alternatively, the cache memory 231 may be implemented in an external memory device (e.g., a portable flash drive) such that the certificate information 232 may be exchanged manually between the DS managing unit 18 and the certificate authority 230.

A digital certificate acquisition sequence begins with the DS managing unit 18 generating certificate information 232 that includes at least one of a device (e.g., the DS unit) universally unique identifier (UUID), a DSN ID, and a device type (e.g., a DS managing unit type, a DS unit type, user device type, a DS processing unit type, etc.). The DS unit 36 receives the certificate information to 32 and stores the certificate information. The DS unit 36 determines to initiate a transaction with the DS managing unit 18 and generates a certificate signing request 234 that includes at least some of the certificate information 232. The DS unit 36 sends the certificate signing request 234 to the DS managing unit 18.

The DS managing unit 18 receives the certificate signing request 234, validates the certificate signing request 234 (e.g., verifies that certificate information of the certificate signing request is consistent with certificate information previously generated for the DS unit), and sends the certificate signing request 234 to the certificate authority 230 when the certificate signing request 234 is validated. The certificate authority 230 receives the certificate signing request 234, validates the certificate signing request 234 (e.g., verifies that they a requester is authorized to perform the transaction), generates a signature for the signature signing request, generates a digital certificate 236 (e.g., a signed certificate) that includes the signature and certificate signing request information, and sends the digital certificate 236 to the DS managing unit. The DS managing unit 18 receives the digital certificate 236, validates the digital certificate 236, and sends the digital certificate 236 to the DS unit 36. The DS unit 36 receives the digital certificate 236, stores the digital certificate 236, and utilizes the digital certificate 236 to authenticate subsequent transactions (e.g., a read request from a user device).

FIG. 11B is a diagram illustrating a signed (e.g., digital certificate) structure 38 that includes a certificate bundle field 240, a certificate signature algorithm field 242, and a certificate signature field 244. The structure may be in accordance with an industry-standard such International Telecommunication Union (ITU) X.509. Entries of the signed certificate 238 may be encoded in accordance with an industry-standard such as abstract syntax notation (ASN.1). The certificate bundle field 240 includes a certificate 246 and one or more certificate extensions 248. The certificate extensions 248 are discussed in greater detail of reference to FIG. 11C.

The certificate 246 includes one or more of a version field, a serial number field, an algorithm ID field, an issuer field, a not before a validity field, a not after validity field, a subject field, a public key algorithm field, a subject public key field, an issuer unique identifier field, and a subject unique ID field. The certificate signature algorithm field 242 includes a certificate signature algorithm entry that identifies a certificate signature algorithm of a plurality of algorithms utilized to produce an entry of the certificate signature field 244. The certificate signature field 244 includes a certificate signature entry generated as a signature of the certificate bundle field 240 (e.g., an encrypted hash of the certificate field utilizing a private key of a signer).

FIG. 11C is a diagram illustrating an example of certificate extensions structure 250 that includes an extension identifier (ID) field 252 and an extension value field 254. The extension ID field 252 includes a plurality of (e.g., any number) of extension ID entries, wherein each extension ID entry includes a private enterprise number (PEN) associated with a manufacturer of system components utilizing a signed certificate. The extension value field 254 includes a plurality of extension value entries that correspond to the plurality of extension ID entries. For example, an extension ID field entry of 1.3.6.1.4.1.28129.4.1 corresponds to an extension value field entry of a device universally unique identifier (UUID), an extension ID field entry of 1.3.6.1.4.1.28129.4.2 corresponds to an extension value field entry of a dispersed storage network UUID, an extension ID field entry of 1.3.6.1.4.1.28129.4.3 corresponds to an extension value field entry of a device type (e.g., 0=dispersed storage (DS) managing unit, 1=DS unit, 2=DS processing unit, 3=gateway), an extension ID field entry of 1.3.6.1.4.1.28129.4.4 corresponds to an extension value field entry of a start namespace range of an allowable namespace range of an associated device (e.g., utilized to restrict migration and writing of encoded data slices within a dispersed storage work (DSN) address range), an extension ID field entry of 1.3.6.1.4.1.28129.4.5 corresponds to an extension value field entry of an end namespace range of the allowable namespace range of the associated device, an extension ID field entry of 1.3.6.1.4.1.28129.4.6 corresponds to an extension value field entry of account permissions of the associated device (e.g., 0=not allowed to unlock an associated account, 1=allowed to unlock the associated account), and an extension ID field entry of 1.3.6.1.4.1.28129.4.7 corresponds to an extension value field entry of credentials permissions of the associated device (e.g., 0=not allowed to reset credentials, 1=allowed to reset credentials).

Figure 11D:
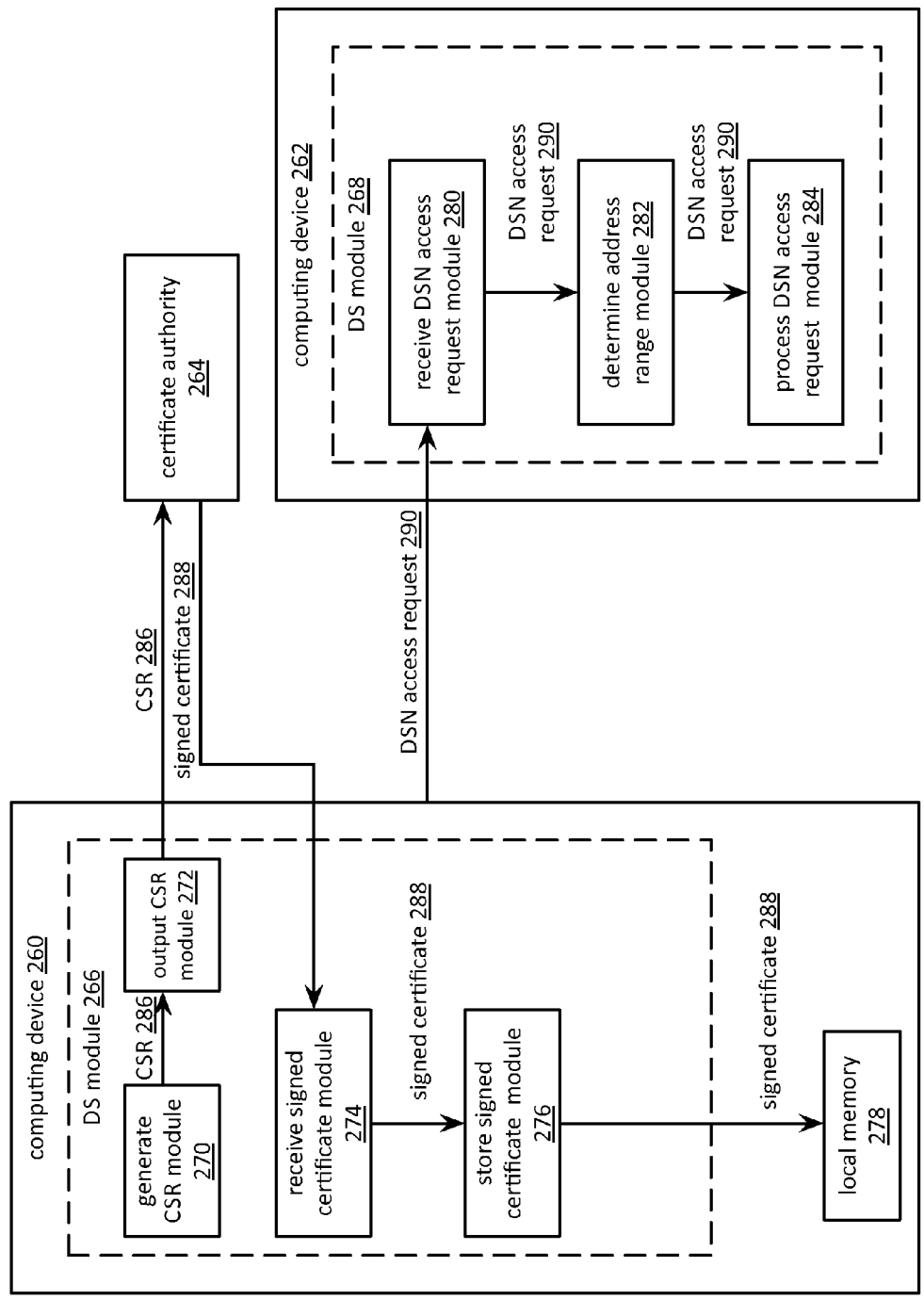
FIG. 11D is a schematic block diagram of another embodiment of a computing system in accordance with the present invention.

FIG. 11D is a schematic block diagram of another embodiment of a computing system that includes computing devices 260-262 and a certificate authority 264. The computing devices 260-262 may be implemented as at least one of a user device, a dispersed storage (DS) processing unit, a DS unit, a storage integrity processing unit, and a DS managing unit. The system functions to validate access of computing device 262 by computing device 260. For example, computing device 260 requests access to computing device 262 when computing device 260 is implemented as a DS processing unit and computing device 262 is implemented as a DS unit.

The computing device 260 includes a DS module 266 and a local memory 278. The local memory 278 includes one or more memory devices. Each memory device of the one or more memory devices may be implemented as one of a random access memory device, a dynamic random access memory device, an optical disc memory device, and a magnetic disk memory device. The DS module 266 includes a generate certificate signing request (CSR) module 270, an output CSR module 272, a receive signed certificate module 274, and a store signed certificate module 276. The computing device 262 includes a DS module 268. The DS module 268 includes a receive dispersed storage network (DSN) access request module 280, a determine address range module 282, and a process DSN access request module 284.

The generate CSR module 270 generates a CSR 286 that includes a certificate and a certificate extension. The certificate includes information regarding a requesting device (e.g., computing device 260). The certificate extension includes information regarding an accessible DSN address range for the requesting device. For example, the certificate extension includes a first private enterprise number (PEN), a second PEN, a first extension value, and a second extension value. The first PEN is associated with the first extension value that defines a starting address of the accessible DSN address range and the second PEN is associated with the second extension value that defines an ending address of the accessible DSN address range. For instance, the first PEN includes a value of 1.3.6.1.4.1.28129.4.4 when the certificate extension includes a start DSN address range certificate extension and the second PEN includes a value of 1.3.6.1.4.1.28129.4.5 when the certificate extension includes an end DSN address range certificate extension.

The CSR 286 may include a variety of other certificate extensions. For example, another certificate extension may include information regarding a unique identifier of the requesting device, wherein the certificate authority generated the unique identifier of the requesting device. As another example, the other certificate extension may include information regarding a unique identifier of the DSN, wherein the certificate authority generated the unique identifier of the DSN. As yet another example, the other certificate extension may include information regarding a device type of the requesting device. As a still further example, the other certificate extension may include information regarding account permissions of the requesting device. As yet a still further example, the other certificate extension may include information regarding credential permissions of the requesting device.

In an example of the CSR 286 including other certificate extensions, the other certificate extensions may include a first PEN, a second PEN, a third PEN, a fourth PEN, a fifth PEN, a first extension value, a second extension value, a third extension value, a fourth extension value, and a fifth extension value. The first PEN is associated with the first extension value that includes the unique identifier of the requesting device. For instance, the first PEN includes a value of 1.3.6.1.4.1.28129.4.1 when the certificate extension includes a device universal unique identifier (UUID) certificate extension. The second PEN is associated with the second extension value that includes the unique identifier of the DSN. For instance, the second PEN includes a value of 1.3.6.1.4.1.28129.4.2 when the certificate extension includes a DSN UUID certificate extension. The third PEN is associated with the third extension value that includes the device type. For instance, the third PEN includes a value of 1.3.6.1.4.1.28129.4.3 when the certificate extension includes a device type certificate extension. The fourth PEN is associated with the fourth extension value that includes the account permissions. For instance, the fourth PEN includes a value of 1.3.6.1.4.1.28129.4.6 when the certificate extension includes an account permissions certificate extension. The fifth PEN is associated with the fifth extension value that includes the credential permissions. For instance, the fifth PEN includes a value of 1.3.6.1.4.1.28129.4.7 when the certificate extension includes a credentials permissions certificate extension.

The generate CSR module 270 further functions to generate the CSR 286 by obtaining the certificate extension and generating the certificate to include at least one of: a version, a serial number, an algorithm identifier (ID), an issuer name, a time validity indicator, a subject ID, a public key algorithm, a public key, an issuer UUID and a subject UUID. The generate CSR module 270 functions to obtain the certificate extension by receiving the certificate extension from the certificate authority 264 or a DSN managing device or retrieving the certificate extension from local memory 278.

The output CSR module 272 outputs the CSR 286 to the certificate authority 264. The receive signed certificate module 274 receives a signed certificate 288 from the certificate authority 264. The signed certificate 288 includes a certification signature of the certificate authority authenticating the certificate and the certificate extension. The receiving may include validating the signed certificate 288 utilizing a subject public key of the signed certificate 288.

The store signed certificate module 276 stores the signed certificate 288 (e.g., validated signed certificate) for use when generating a DSN access request 290. The DSN access request 290 is requesting access to dispersed storage error encoded data in the DSN at an address within the accessible DSN address range. The DSN access request 290 may be utilized to perform a DSN operation including at least one of writing to the DSN, reading to the DSN, obtaining a list, and deleting data stored in the DSN. Prior to storing the signed certificate 288, the store signed certificate module 276 further functions to indicate that the signed certificate 288 is valid when a device UUID of the certificate extension compares favorably to a device UUID contained in the signed certificate 286 (e.g., compares favorably when substantially the same).

The receive DSN access request module 280 receives, from the requesting device (e.g., computing device 260), the DSN access request 290 that includes a DSN address and the signed certificate 288. The receive DSN access request module 280 functions to receive the DSN access request 290 by validating the signed certificate 288 utilizing one or more of a variety of approaches. In a first approach, the receive DSN access request module 280 indicates that the signed certificate 288 is valid when validation of a certificate signature of the signed certificate 288 utilizing the subject public key of the signed certificate 288 is favorable. In a second approach, the receive DSN access request module 280 indicates that the signed certificate 288 is valid when a certificate issuer identifier (ID) of the signed certificate 288 compares favorably to a validated certificate issuer ID (e.g., match the certificate issuer ID to a known certificate authority ID associated with the DSN). In a third approach, the receive DSN access request module 280 indicates that the signed certificate 288 is valid when a time of validity indicator of the signed certificate 288 compares favorably to a current time (e.g., favorable when current time is greater than a not before validity time of the time of validity indicator and the current time is less than a not after validity time of the time of validity indicator).

The receive DSN access request module 280 further functions to determine whether the DSN access request 290 is authorized by at least one of a variety of methods. In a first method, the DSN access request module 280 indicates that the DSN access request 290 is authorized when a device ID of the certificate extension compares favorably to a requesting entity ID of the DSN access request (e.g., compares favorably when a device UUID certificate extension value is substantially the same as a requesting entity UUID of the DSN access request 290). In a second method, the DSN access request module 280 indicates that the DSN access request 290 is authorized when a DSN ID of the certificate extension compares favorably to a retrieved DSN ID (e.g., compares favorably when a DSN UUID certificate extension value is substantially the same as a DSN UUID affiliated with the authorizing). In a third method, the DSN access request module 280 indicates that the DSN access request 290 is authorized when a device type of the certificate extension compares favorably to an allowable device type associated with the DSN access request 290 (e.g., compares favorably when the device type certificate extension value matches the allowable device type associated with the DSN access request 290).

The determine address range module 282 determines whether the DSN address is within the DSN address range for the requesting device. The determining may include extracting the starting address of the accessible DSN address range and the ending address of the accessible DSN address range from the certificate extension of the signed certificate 288. For example, the determine address range module 282 determines that the DSN address is within the DSN address range when the DSN address is greater than the starting address of the accessible DSN address range and less than the ending address of the accessible DSN address range. When the DSN access request 290 is within the accessible DSN address range for the requesting device, the process DSN access request module 284 process the DSN access request (e.g., executing the DSN access request).

FIG. 11E is a flowchart illustrating an example of obtaining a signed certificate. The method begins at step 300 where a processing module (e.g., of a requesting device) generates a certificate signing request (CSR) that includes a certificate and a certificate extension. The certificate includes information regarding the requesting device. The certificate extension includes information regarding an accessible dispersed storage network (DSN) address range for the requesting device. The generating the CSR further includes obtaining the certificate extension and generating the certificate to include at least one of: a version, a serial number, an algorithm identifier (ID), an issuer name, a time validity indicator, a subject ID, a public key algorithm, a public key, an issuer universal unique identifier (UUID), and a subject UUID. The obtaining the certificate extension includes receiving the certificate extension from the certificate authority or a DSN managing device or retrieving the certificate extension from a local memory.

The method continues at step 302 where the processing module outputs the CSR to a certificate authority of a DSN. For example, the processing module outputs the CSR directly to the certificate authority. As another example, the processing module sends the CSR to the certificate authority via a DS managing unit. The method continues at step 304 where the processing module receives a signed certificate from the certificate authority. The signed certificate includes a certification signature of the certificate authority authenticating the certificate and the certificate extension. The receiving the signed certificate may include validating the signed certificate based on a public key associated with the signed certificate.

Prior to storing the signed certificate, the method continues at step 306 where the processing module indicates that the signed certificate is valid when a device universal unique identifier (UUID) of the certificate extension compares favorably to a device UUID contained in the signed certificate (e.g., compares favorably when substantially the same). The method continues at step 308 where the processing module stores the signed certificate for use when generating a DSN access request. The DSN access request requests access to dispersed storage error encoded data in the DSN at an address within the accessible DSN address range. The method continues at step 310 where the processing module generates the DSN access request utilizing the signed certificate.

FIG. 11F is a flowchart illustrating an example of processing a dispersed storage network (DSN) access request. The method begins at step 312 where a processing module (e.g., a dispersed storage module) receives, from a requesting device, a dispersed storage network (DSN) access request that includes a DSN address and a signed certificate. The signed certificate includes a certificate and a certificate extension. The certificate includes information regarding a requesting device. The certificate extension includes information regarding an accessible DSN address range for the requesting device.

The receiving the DSN access request includes validating the signed certificate by one or more of a variety of approaches. In a first approach, the processing module indicates that the signed certificate is valid when validation of a certificate signature of the signed certificate utilizing a public key of the signed certificate is favorable. In a second approach, the processing module indicates that the signed certificate is valid when a certificate issuer identifier (ID) of the signed certificate compares favorably to a validated certificate issuer ID. In a third approach, the processing module indicates that the signed certificate is valid when a time of validity indicator of the signed certificate compares favorably to a current time.

The method continues at step 314 where the processing module determines whether the DSN access request is authorized utilizing at least one of a variety of approaches. In a first approach, the processing module indicates that the DSN access request is authorized when a device identifier (ID) of the certificate extension compares favorably to a requesting entity ID of the DSN access request. In a second approach, the processing module indicates that the DSN access request is authorized when a DSN ID of the certificate extension compares favorably to a retrieved DSN ID. In a third approach, the processing module indicates that the DSN access request is authorized when a device type of the certificate extension compares favorably to an allowable device type associated with the DSN access request.

The method continues at step 316 where the processing module determines whether the DSN address is within the accessible DSN address range for the requesting device. The determining includes determining whether the DSN addresses within the accessible DSN address range for the requesting device when the DSN access request is authorized. For example, the processing module determines that the DSN address is within the accessible DSN address range for the requesting device when the processing module extracts the DSN address from the DSN access request and verifies that the DSN address is greater than a starting address of the accessible DSN address range extracted from the certificate extension and less than an ending address of the accessible DSN address range of the accessible DSN address range extracted from the certificate extension. When the DSN address is within the accessible DSN address range for the requesting device, the method continues at step 318 where the processing module processes the DSN access request (e.g., executing the DSN access request).

Figure 12A:
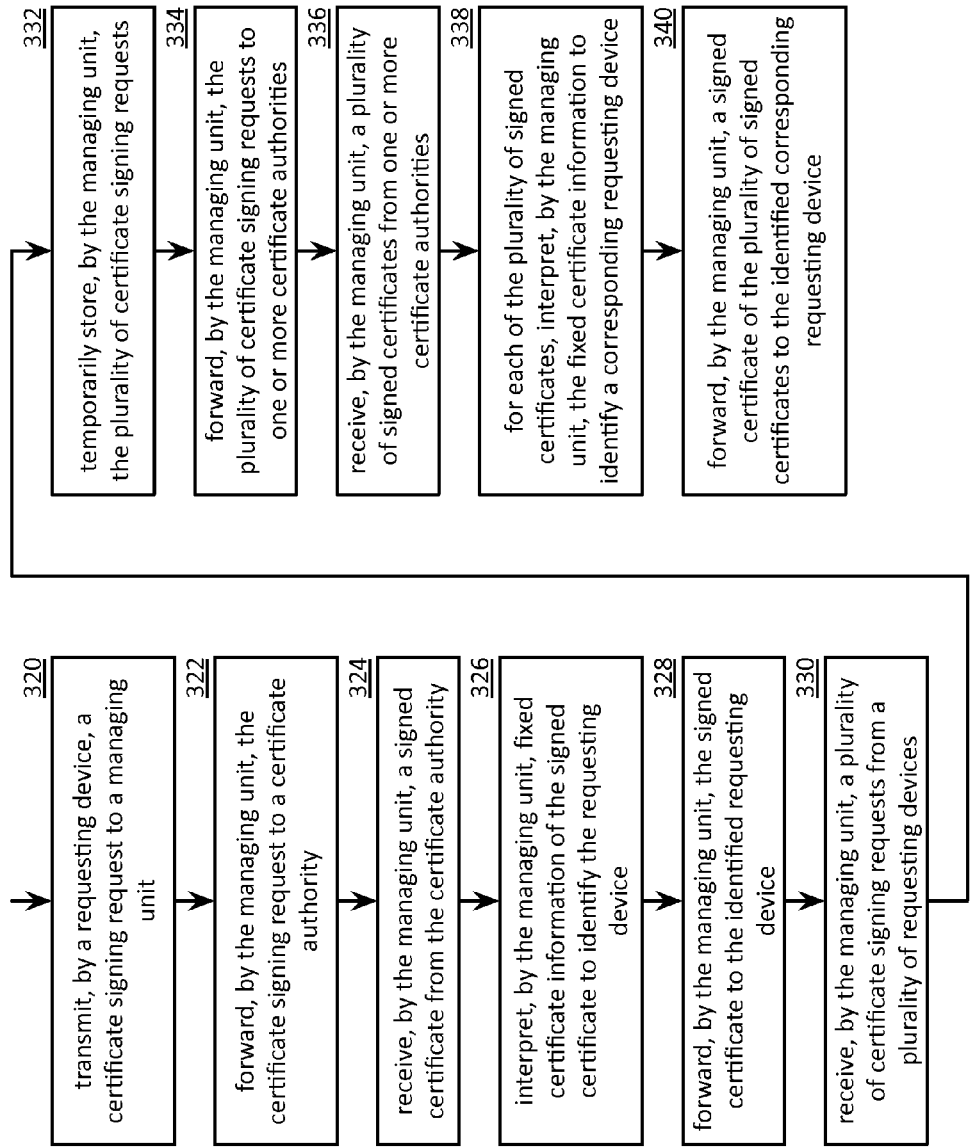
FIG. 12A is a flowchart illustrating an example of processing a certificate signing request in accordance with the present invention.

FIG. 12A is a flowchart illustrating an example of processing a certificate signing request. The method begins at step 320 where a requesting device (e.g., a user device, a dispersed storage (DS) processing unit, a DS unit) transmits a certificate signing request (CSR) to a managing unit (e.g., a DS managing unit). The certificate signing request includes fixed certificate information and suggested certificate information. The fixed certificate information includes at least one of a public key of the requesting device (e.g., a subject public key of a public/private key pair generated by the requesting device in accordance with a public key infrastructure approach), a universal unique identifier (UUID) of the requesting device, a dispersed storage network (DSN) UUID of a DSN that the requesting device is affiliated with, and a device type of the requesting device. The suggested certificate information includes at least one of a CSR format version, a serial number of the CSR, an algorithm identifier (ID) for a signed certificate generation algorithm, an issuer name of a desired certificate authority, a requested time validity period, a subject ID of the requesting device, a public key algorithm, an issuer UUID of the desired certificate authority, the UUID of the requesting device, the DSN UUID of the DSN that the requesting device is affiliated with, the device type of the requesting device, requested account permissions for the requesting device, and requested credential permissions for the requesting device.

The method continues at step 322 where the managing unit forwards the certificate signing request to a certificate authority. For example, the processing module forwards the CSR to the desired certificate authority. Alternatively, the managing unit modifies a portion of the suggested certificate information prior to forwarding the CSR to the certificate authority. For example, the managing unit replaces the subject ID of the requesting device with a new subject ID in accordance with a requesting device ID assignment approach (e.g., to eliminate duplicate IDs, to assign consecutive IDs, etc.). The method continues at step 324 where the managing unit receives a signed certificate from the certificate authority. The signed certificate includes a certificate and a certification signature. The certificate includes the fixed certificate information and determined certificate information based on the suggested certificate information.

The determined certificate information includes at least one of the CSR format version or an alternate CSR format, the serial number of the CSR or a new CSR serial number, the algorithm ID or an alternate algorithm ID for an alternate signed certificate generation algorithm, the issuer name of the desired certificate authority or an issuer name of an actual certificate authority, the requested time validity period or an alternate time validity period, the subject ID of the requesting device or a new subject ID for the request device, the public key algorithm or an alternate public key algorithm, the UUID of the desired certificate authority or the UUID of the actual certificate authority, the subject UUID or a new UUID for the requesting device, the DSN UUID or a new DSN UUID of a DSN that the requesting device is to be affiliated with, the device type or a new device type for the requesting device, the requested account permissions or determined account permissions for the requesting device, and the requested credential permissions or determined credential permissions for the requesting device. For example, the fixed certificate information includes the subject public key of the requesting entity (e.g., fixed certificate information) and determined certificate information that includes the alternate time validity period, the subject UUID, the DSN the UUID, the device type, the determined account permissions for the requesting device, and determined credential permissions for the requesting device.

The method continues at step 326 where the managing unit interprets the fixed certificate information of the signed certificate to identify the requesting device. The interpreting the fixed certificate information includes comparing the fixed information of the certificate signing request to the fixed information of the signed certificate and when the fixed information of the certificate signing request compares favorably to the fixed information of the signed certificate, accessing a certificate signing request list to identify the requesting device. The certificate signing request list includes the certificate signing request, a requesting device identifier based on the suggested certificate information or assigned by the managing unit, and an address of the requesting device (e.g., internet protocol address). For example, the managing unit identifies the requesting device based on a requesting device ID of the CSR when a subject public key of the CSR is substantially the same as a subject public key of the signed certificate. The method continues at step 328 where the managing unit forwards the signed certificate to the identified requesting device. For example, the managing unit forwards the signed certificate to the internet protocol address associated with the requesting device.

Alternatively, the managing unit may process a plurality of certificate signing requests (CSRs) from time to time. The method continues at step 330 where the managing unit receives, over time, a plurality of CSRs from a plurality of requesting devices. The plurality of CSRs includes the CSR. For example, the managing unit receives each CSR of the plurality of CSRs one at a time. As another example, the managing unit receives each CSR of the plurality of CSRs substantially simultaneously.

The method continues at step 332 where the managing unit temporarily stores the plurality of CSRs. For example, the managing unit stores the plurality of CSRs in a local cache memory of the managing unit. The method continues at step 334 where the managing unit forwards the plurality of CSRs to one or more certificate authorities, which includes the certificate authority. The forwarding may include identifying the one or more certificate authorities based on one or more of a predetermination, a round-robin approach, a DSN affiliation, and a desired certificate authority associated with a CSR to be forwarded. For example, the managing unit forwards the CSR to the desired certificate authority associated with the CSR (e.g., from suggested certificate information of the CSR).

The method continues at step 336 where the managing unit receives, overtime, a plurality of signed certificates from the one or more certificate authorities. For each of the plurality of signed certificates, the method continues at step 338 where the managing unit interprets the fixed certificate information to identify a corresponding requesting device of the plurality of requesting devices. For example, the managing unit identifies the corresponding requesting device when a CSR of the corresponding requesting device (e.g., retrieved from the local cache memory) includes a subject public key that is substantially same as a subject public key of the fixed certificate information of the signed certificate. The method continues at step 340 where the managing unit forwards a signed certificate of the plurality of signed certificates to the identified corresponding requesting device of the plurality of requesting devices.

Figure 12B:
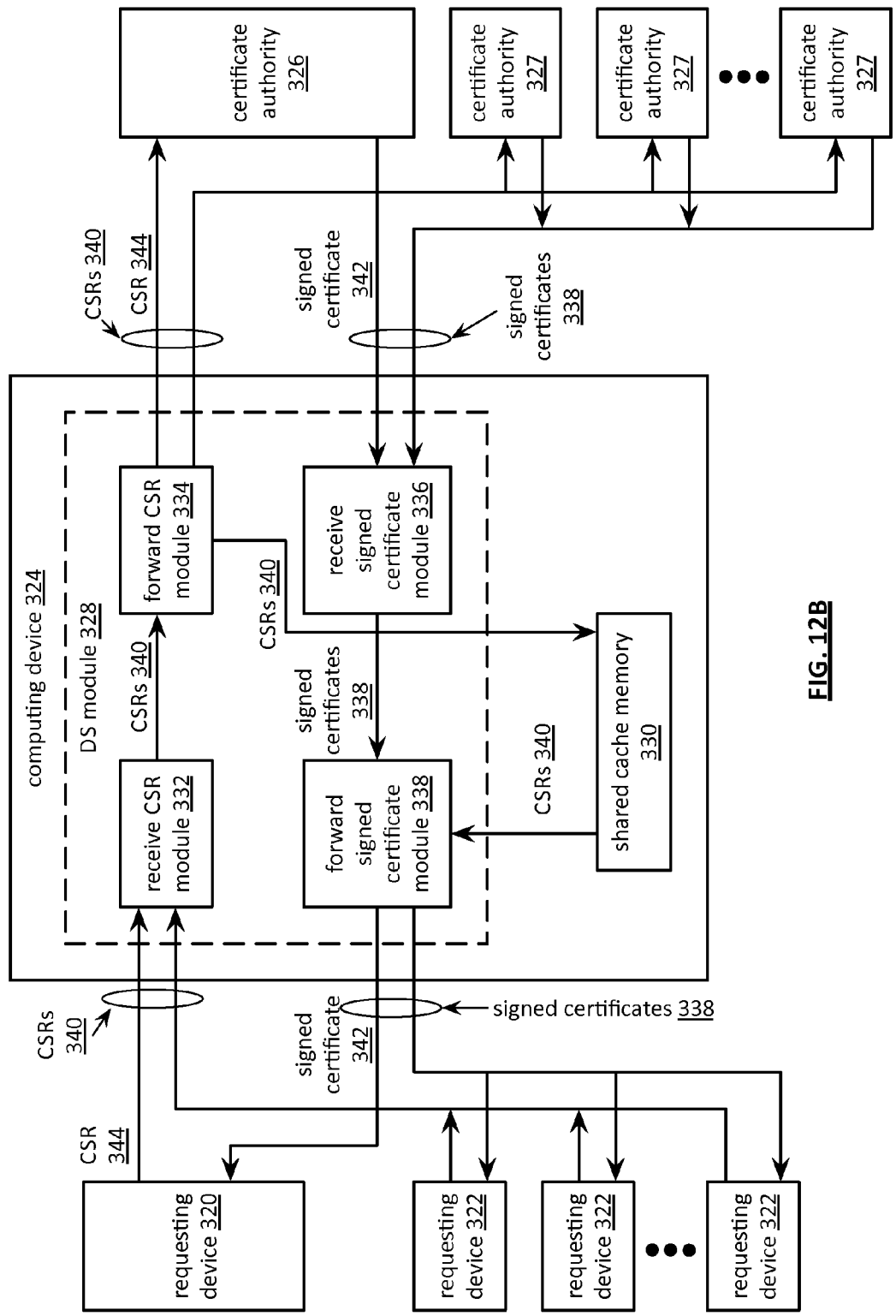
FIG. 12B is a schematic block diagram of another embodiment of a computing system in accordance with the present invention.

FIG. 12B is a schematic block diagram of another embodiment of a computing system that includes a plurality of requesting devices 320-322, a computing device 324, and a plurality of certificate authorities 326-327. The plurality of requesting devices 320-324 may include two or more of a user device, a dispersed storage processing (DS) unit, a DS unit, and a storage integrity processing unit. The computing device 324 may be implemented as at least one of a DS processing unit and a DS managing unit. The certificate authorities 326-327 may be implemented as one of more of a processing module, a certificate authority server, a DS processing unit, and a DS managing unit.

The computing device 324 includes a DS module 328 and a shared cache memory 330. The shared cache memory 330 includes one or more memory devices. Each memory device of the one or more memory devices may be implemented as one of a random access memory device, a dynamic random access memory device, a removable memory, an optical disc memory device, and a magnetic disc memory device. The shared cache memory 330 may be accessible for information transfer by one or more of the DS module 328, a requesting device of the plurality of requesting devices 320-322, and a certificate authority of the plurality of certificate authorities 326-327. The DS module 328 includes a receive certificate signing request (CSR) module 332, a forward CSR module 334, a receive signed certificate module 336, and a forward signed certificate module 338.

The system is operable to facilitate obtaining of a plurality of signed certificates 338 by the plurality of requesting devices 320-322 utilizing a plurality of certificate signing requests (CSRs) 340 enabling the plurality of requesting devices 320-322 to subsequently access a dispersed storage network (DSN) utilizing the plurality of signed certificates 338. For example, computing device 324 facilitates the obtaining of a signed certificate 342 from certificate authority 326 by requesting device 320 in response to a certificate signing request (CSR) 344 from requesting device 320.

The receive CSR module 332 receives, from requesting device 320, certificate signing request 344 that includes fixed certificate information and suggested certificate information. The receiving the certificate signing request 344 includes at least one of retrieving the certificate signing request 344 from the shared cache memory 330 and receiving the certificate signing request 344 directly from requesting device 320. The requesting device 320 is operable to store CSR 344 in the shared cache memory 330 prior to the receive CSR module 332 retrieving the CSR 344 from the shared cache memory 330.

The forward CSR module 334 forwards the certificate signing request 344 to certificate authority 326. The forwarding includes at least one of storing CSR 344 and the shared cache memory 330 and outputting CSR 344 directly to the certificate authority 326. The certificate authority 326 is operable to retrieve CSR 344 from the shared cache memory 330 subsequent to the forward CSR module 334 storing the CSR 344 in the shared cache memory 330.

The receive signed certificate module 336 receives signed certificate 342 from the certificate authority 326. The receiving includes at least one of retrieving the signed certificate 342 from the shared cache memory 330 and receiving the signed certificate 342 directly from the certificate authority 326. The certificate authority 326 is operable to store signed certificate 342 in the shared cache memory 330 prior to the received signed certificate module 336 retrieving the signed certificate 342 from the shared cache memory 330. The signed certificate 342 includes a certificate and a certification signature. The certificate includes the fixed certificate information and determined certificate information based on the suggested certificate information.

The forward signed certificate module 338 interprets the fixed certificate information of the signed certificate 342 to identify the requesting device 320 and forwards the signed certificate 342 to the identified requesting device 320. The forward signed certificate module 338 functions to interpret the fixed certificate information by comparing the fixed information of the certificate signing request 344 to the fixed information of the signed certificate 342 and when the fixed information of the certificate signing request 344 compares favorably to the fixed information of the signed certificate 342, accessing a certificate signing request list to identify the requesting device 320. The forward signed certificate module 338 functions to forward the signed certificate 342 to the identified requesting device 320 by at least one of storing the signed certificate 342 in the shared cache memory 330 and outputting the signed certificate 342 directly to the requesting device 320. The requesting device 320 is further operable to retrieve the signed certificate 342 from the shared cache memory 330 subsequent to the forward signed certificate module 338 storing the signed certificate 342 in the shared cache memory 330.

The receive CSR module 332 may receive, over time, the plurality of certificate signing requests (CSRs) 340 from the plurality of requesting devices 320-322. The plurality of CSRs 340 includes the certificate signature request 344. The receive CSR module 332 temporarily stores the plurality of CSRs (e.g., in the shared cache memory 330). The forward CSR module 334 forwards the plurality of CSRs 340 to one or more certificate authorities of the plurality of certificate authorities 326-327, which includes the certificate authority 326. The receive signed certificate module 336 receives, over time, the plurality of signed certificates 338 from the one or more certificate authorities 326-327. For each of the plurality of signed certificates 338, the forward signed certificate module 338 interprets the fixed certificate information to identify the corresponding requesting device 320 of the plurality of requesting devices 320-322 (e.g., when the signed certificate 342 is associated with requesting device 320). The forward signed certificate module 338 forwards signed certificate 342 of the plurality of signed certificates 338 to the identified corresponding requesting device 320 of the plurality of requesting devices 320-322.

FIG. 12C is a flowchart illustrating another example of processing a certificate signing request. The method begins at step 350 where a processing module (e.g., of a dispersed storage (DS) managing unit) receives, from a requesting device (e.g., a user device, a dispersed storage (DS) processing unit, a DS unit), a certificate signing request (CSR) that includes fixed certificate information and suggested certificate information. The method continues at step 352 where the processing module forwards the certificate signing request to a certificate authority. For example, the processing module forwards the CSR to a desired certificate authority of the suggested certificate information. Alternatively, or in addition to, the processing module modifies a portion of the suggested certificate information prior to forwarding the CSR to the certificate authority. For example, the processing module replaces a requested time validity period with an alternate time validity period in accordance with a time validity period policy.

The method continues at step 354 where the processing module receives a signed certificate from the certificate authority. The signed certificate includes a certificate and a certification signature. The certificate includes the fixed certificate information and determined certificate information based on the suggested certificate information. The method continues at step 356 where the processing module interprets the fixed certificate information of the signed certificate to identify the requesting device. The interpreting the fixed certificate information includes comparing the fixed information of the certificate signing request to the fixed information of the signed certificate and when the fixed information of the certificate signing request compares favorably to the fixed information of the signed certificate, accessing a certificate signing request list to identify the requesting device.

The certificate signing request list includes the certificate signing request, a requesting device identifier based on the suggested certificate information or assigned by the processing module, and an address of the requesting device (e.g., internet protocol address). For example, the processing module identifies the requesting device based on a requesting device universally unique identifier (UUID) of the CSR when a subject public key of the CSR is substantially the same as a subject public key of the signed certificate. The method continues at step 358 where the processing module forwards the signed certificate to the identified requesting device.

Alternatively, the processing module may process a plurality of certificate signing requests (CSRs) from time to time. The method continues at step 360 where the processing module receives, over time, a plurality of CSRs from a plurality of requesting devices. The plurality of CSRs includes the CSR. For example, the processing module receives each CSR of the plurality of CSRs one at a time. As another example, the processing module receives each CSR of the plurality of CSRs substantially simultaneously.

The method continues at step 362 where the processing module temporarily stores the plurality of CSRs. For example, the processing module stores the plurality of CSRs in a shared cache memory of the DS managing unit. The method continues at step 364 where the processing module forwards the plurality of CSRs to one or more certificate authorities, which includes the certificate authority. The forwarding may include identifying the one or more certificate authorities based on one or more of a predetermination, a round-robin approach, a DSN affiliation, and a desired certificate authority associated with a CSR to be forwarded. For example, the processing module forwards the CSR to the desired certificate authority associated with the CSR (e.g., from suggested certificate information of the CSR).

The method continues at step 366 where the processing module receives, over time, a plurality of signed certificates from the one or more certificate authorities. For each of the plurality of signed certificates, the method continues at step 368 where the processing module interprets the fixed certificate information to identify a corresponding requesting device of the plurality of requesting devices. For example, the processing module identifies the corresponding requesting device when a CSR of the corresponding requesting device (e.g., retrieved from the shared cache memory) includes a subject public key that is substantially same as a subject public key of the fixed certificate information of the signed certificate. The method continues at step 370 where the processing module forwards a signed certificate of the plurality of signed certificates to the identified corresponding requesting device of the plurality of requesting devices.

FIG. 13A is a diagram illustrating an example of a before and after modified data object to data segment mapping. The mapping includes an original data object 372 that includes all original data 374 that is divided to produce data segments 1-5 and a modified data object 375 that includes original data 376-378 and new data 380 that is mapped to data segment 1, modified data segment 2, modified data segment 3, and modified data segment 4.

The original data object 372 is divided in accordance with a data segmentation approach to produce data segments 1-5. Each data segment of the data segments 1-5 is dispersed storage error encoded to produce a plurality of sets of encoded data slices. The plurality of sets of encoded data slices is stored in a dispersed storage network (DSN) memory. The original data object 372 is modified to produce the modified data object 375 that includes original data 376-378 and new data 380 such that the new data 380 is inserted into the original data 380 partially replacing some of the original data 374. As illustrated, the modified data object 375 includes more data than the original data object 372. Alternatively, the modified data object 375 may include less data than the original data object 372.

The new data 380 is mapped to a modified data segment 3 when data segment 2 maps to a portion of original data 376 and data segment 4 maps to a portion of original data 378. The modified data segment 3 includes the new data 380, another portion of original data 376, and another portion of original data 378. Modified data segment 3 is dispersed storage error encoded to produce a new set of encoded data slices. The new set of encoded data slices is sent to the DSN memory to replace a previous set of encoded data slices corresponding to data segment 3. Alternatively, only new slices of the new set of encoded data slices are sent to the DSN memory to replace corresponding encoded data slices of the previous set of encoded data slices corresponding to data segment 3.

FIG. 13B is a diagram illustrating an example of a before and after modified data object to data segment mapping. The mapping includes an original data object 372 that includes all original data three and 74 that is divided to produce data segments 1-5 and a modified data object 382 that includes original data 384-386 and new data 388 that is mapped to data segment 1, modified data segment 2, modified data segment 3, modified data segment 4, and data segment 5.

The original data object 372 is divided in accordance with a data segmentation approach to produce data segments 1-5. Each data segment of the data segments 1-5 is dispersed storage error encoded to produce a set of encoded data slices.

Each set of encoded data slices is stored in a dispersed storage network (DSN) memory. The original data object 372 is modified to produce the modified data object 382 that includes original data 384-386 and new data 388 such that the new data 388 is inserted into the original data 374 partially replacing some of the original data 374. As illustrated, the modified data object 382 includes more data than the original data object 372. Alternatively, the modified data object 382 includes less data than the original data object 372.

The new data 388 is mapped to modifications of data segments 2-4. The new data treaty partially modifies data segment 2 to produce modified data segment 2, replaces and adds to data segment 3 to produce modified data segment 3, and modifies data segment 4 to produce modified data segment 4. A portion of original data 384 and new data 388 corresponding to modified data segment 2 is dispersed storage error encoded to produce a new set of encoded data slices. The new of set of encoded data slices are sent to the DSN memory to replace a previously stored set of encoded data slices corresponding to data segment 2. New data 388 corresponding to modified data segment 3 is dispersed storage error encoded to produce another set of encoded data slices. The other set of encoded data slices are sent to the DSN memory to replace a previously stored set of encoded data slices corresponding to data segment 3. A portion of original data 386 and new data 388 corresponding to modified data segment 4 is dispersed storage error encoded to produce yet another set of encoded data slices. The yet another set of encoded data slices are sent to the DSN memory to replace a previously stored set of encoded data slices corresponding to data segment 4. Alternatively, only new slices of the sets of encoded data slices corresponding to modified data segments 2 and 4 are sent to the DSN memory to replace corresponding encoded data slices of the previously stored encoded data slices corresponding to data segments 2 and 4.

Figure 13C:
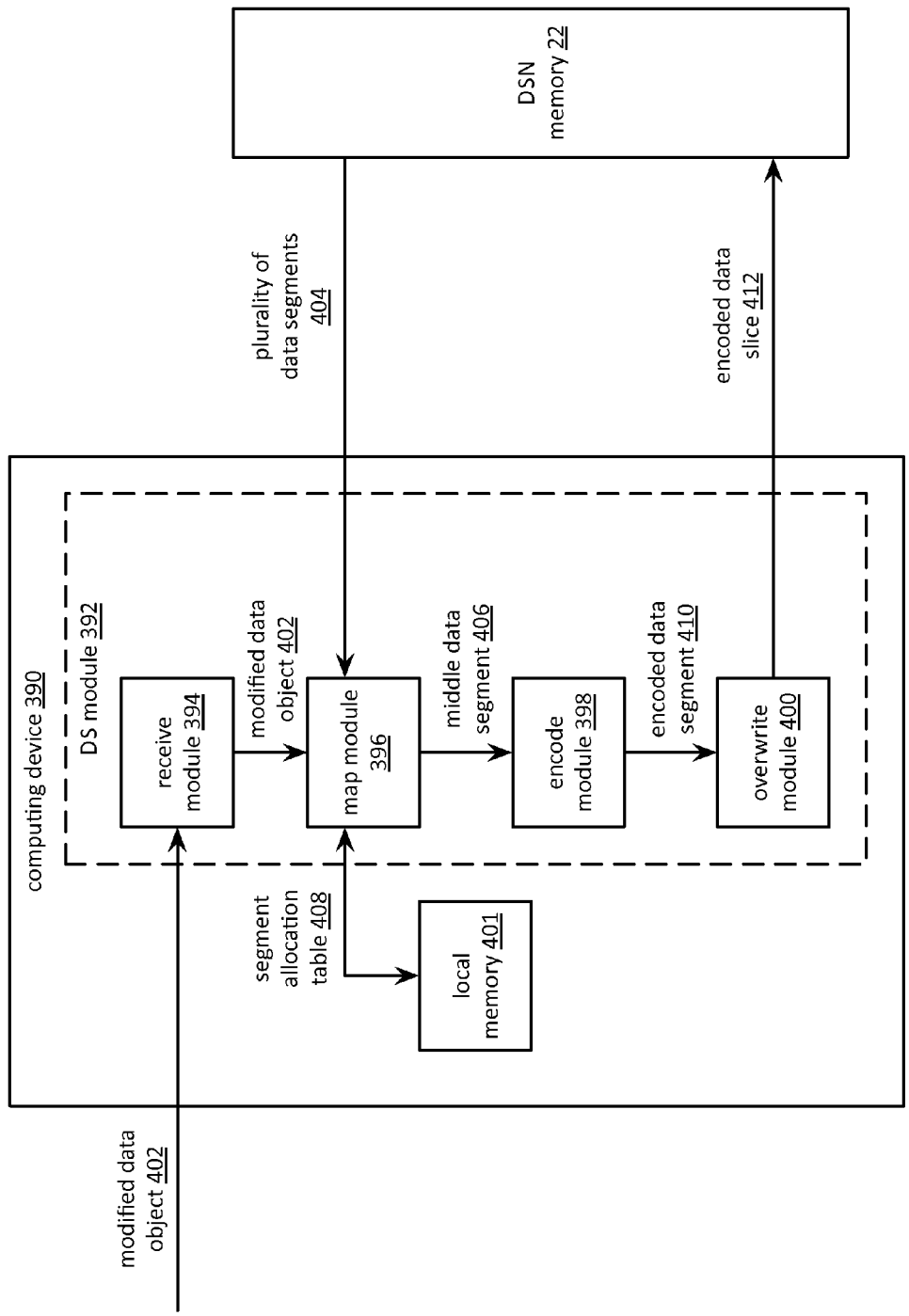
FIG. 13C is a schematic block diagram of another embodiment of a computing system in accordance with the present invention.

FIG. 13C is a schematic block diagram of another embodiment of a computing system that includes a computing device 390, and a dispersed storage network (DSN) memory 22. The computing device 390 may be implemented as one or more of a user device, a dispersed storage processing (DS) unit, a DS unit, a DS managing unit, and a storage integrity processing unit. The computing device 390 includes a DS module 392 and a local memory 401. The local memory 401 includes one or more memory devices. Each memory device of the one or more memory devices may be implemented as one of a random access memory device, a dynamic random access memory device, a removable memory, an optical disc memory device, and a magnetic disc memory device. The DS module 392 includes a receive module 394, a map module 396, an encode module 398, and an overwrite module 400.

A data object is divided into a plurality of data segments 404 that is encoded using a dispersed storage error coding function and stored in the DSN memory 22. The receive module 394 receives a modified data object 402 for storage in the DSN memory 22. The modified data object 402 is a modified version of the data object. The modified data object 402 includes at least one of beginning data, middle data, and ending data that is different than the data object.

The map module 396 maps portions of the modified data object 402 to the plurality of data segments 404 utilizing a variety of approaches. In a first approach, when a portion of the portions of the modified data object 402 maps to a data segment of the plurality of data segments 404, the map module 396 adds the data segment to a second plurality of data segments for the modified data object 402. In a second approach, when another portion of the portions of the modified data object 402 does not map to one of the plurality of data segments 404, the map module 396 determines whether the another portion corresponds to beginning data, middle data, or ending data of the modified data object. When the other portion corresponds to the middle data of the modified data object, the map module 396 creates a middle data segment 406 of the second plurality of data segments based on a corresponding middle data segment of the plurality of data segments 404.

The map module 396 further functions to partition the modified data object into the portions based on known size of data segments of the plurality of data segments 404 of the data object. The middle data segment 406 may be a different size than a corresponding data segment of the middle data when at least one adjacent data segment of the second plurality of data segments includes data of a previous revision at a boundary of the adjacent data segment. The middle data segment 406 may be a same size as the corresponding data segment of the middle data when the modified data segment includes data of the previous revision at the boundary of the adjacent data segment.

The map module 396 functions to map by comparing a deterministic function value (e.g., hashing function, hash-based message authentication code (HMAC), mask generating function (MGF)) of one of the portions of the modified data object 402 with a deterministic function value of a corresponding data segment of the plurality of data segments 404. Alternatively, the map module 396 functions to map by comparing the one of the portions of the modified data object 402 directly with the corresponding data segment of the plurality of data segments 404. The map module 396 further functions to access a segment allocation table 408 to obtain the deterministic function value of the corresponding data segment. For example, the map module 396 retrieves the segment allocation table 408 from the local memory 401. As another example, the map module 396 retrieves the segment allocation table 408 from the DSN memory 22. The map module 396 indicates that the one of the portions maps to the corresponding data segment when the deterministic function value of the one of the portions substantially matches the deterministic function value of the corresponding data segment. The map module 396 indicates that the one of the portions does not map to the corresponding data segment when the deterministic function value of the one of the portions does not substantially match the deterministic function value of the corresponding data segment.

The map module 396 further functions to update the segment allocation table 408 of the data object with the second plurality of data segments. The module 396 updates the segment allocation table 408 to include one or more of location information with regards to the second plurality of data segments and data segment size indicators corresponding to one or more data segments of the second plurality of data segments. The map module 396 further functions to create at least one new beginning data segment for the second plurality of data segments when the another portion corresponds to the beginning data of the modified data object. The map module 396 further functions to create at least one new ending data segment for the second plurality of data segments when the another portion corresponds to the ending data of the modified data object. The map module 396 further functions to create the second plurality of data segments to have a same number of data segments as the plurality of data segments 404 when the modified data object 402 includes modification to the middle data.

The encode module 398 encodes the middle data segment 406 of the second plurality of data segments using the dispersed storage error coding function to produce an encoded data segment 410. The encode module 398 functions to encode the middle data segment utilizing a sequence of steps. In a first step, the encode module 398 divides the middle data segment into a matrix of data blocks (e.g., bytes of the data segment). In a second step, the encode module 398 creates an encoded data block matrix based on the matrix of data blocks and an encoding matrix of the dispersed storage error coding function. For example, the encode module 398 matrix multiplies the matrix of data blocks by the encoding matrix to produce the encoded data block matrix. In a third step, the encode module 398 creates a set of encoded data slices from the encoded data block matrix (e.g., slices include one or more bytes per row of the encoded data block matrix).

The overwrite module 400 overwrites the corresponding middle data segment with the encoded data segment 410 and in the DSN. The overwrite module 400 functions to overwrite the corresponding middle data segment with the encoded data segment 410 utilizing a sequence of steps. In a first step, the overwrite module 400 identifies an encoded data slice 412 of the set of encoded data slices that is different than a corresponding encoded data slice of a second set of encoded data slices of the corresponding middle data segment (e.g., previously stored in the DSN memory 22). In a second step, the overwrite module 400 overwrites, in a dispersed storage (DS) unit of the DSN memory 22, the corresponding encoded data slice with the encoded data slice 412. For example, the overwrite module 400 generates a write slice request that includes the encoded data slice 412 and sends the write slice request to the DS unit.

Figure 13D:
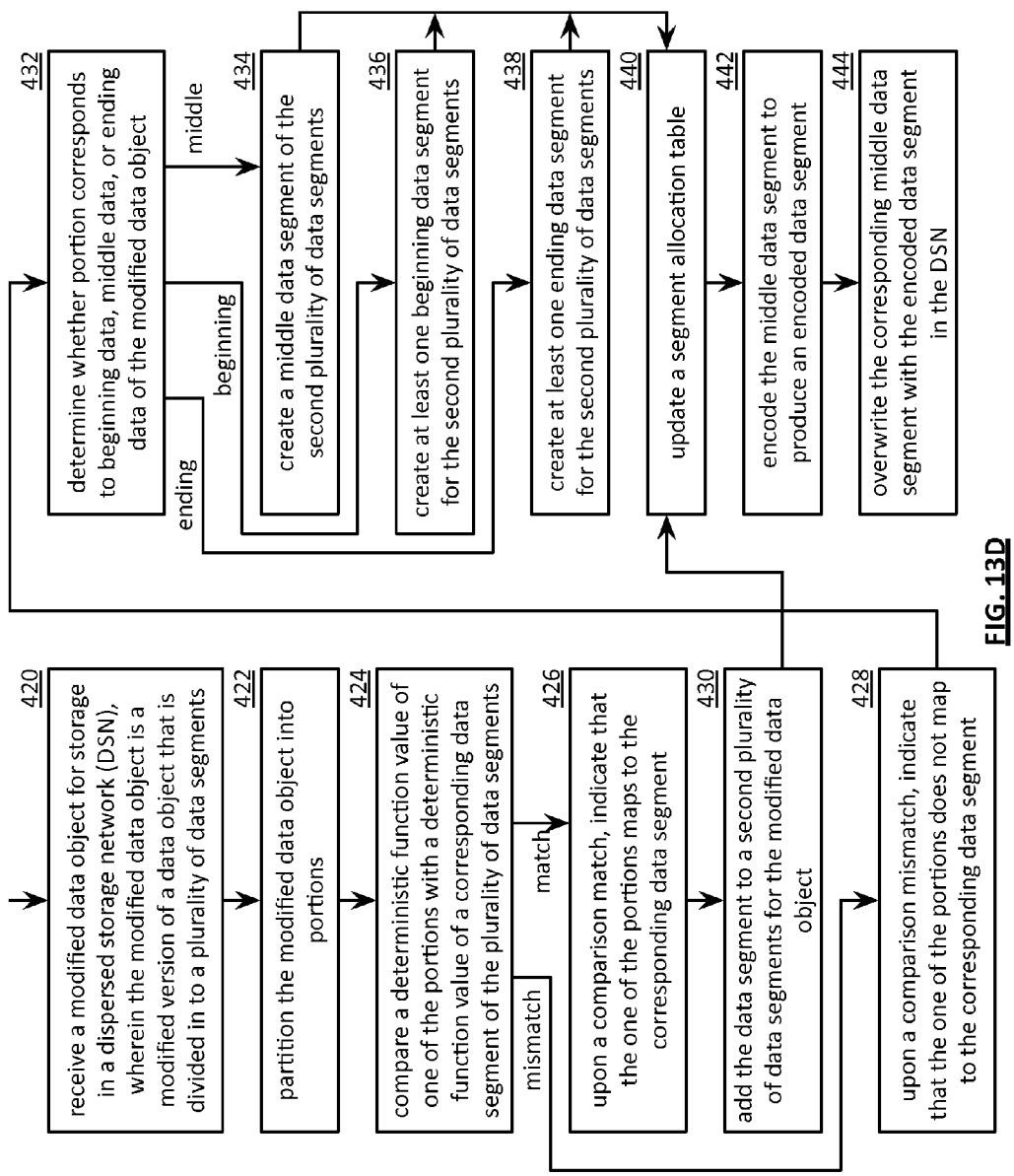
FIG. 13D is a flowchart illustrating an example of modifying encoded data slices in accordance with the present invention.

FIG. 13D is a flowchart illustrating an example of modifying encoded data slices. The method begins at step 420 where a processing module (e.g., of a dispersed storage (DS) processing unit) receives a modified data object for storage in a dispersed storage network (DSN). The modified data object is a modified version of a data object wherein the data object is divided into a plurality of data segments that is encoded using a dispersed storage error coding function and stored in the DSN. The method continues at step 422 wherein the processing module partitions the modified data object into portions based on known size of data segments of the plurality of data segments of the data object to enable mapping of the portions of the modified data object to the plurality of data segments.

The method continues at step 424 where the processing module compares a deterministic function value of one of the portions of the modified data object with a deterministic function value of a corresponding data segment of the plurality of data segments. The comparing includes accessing a segment allocation table to obtain the deterministic function value of the corresponding data segment. The method branches to step 428 when the comparison indicates a mismatch. The method continues to step 426 when the comparison indicates a match. When the deterministic function value of the one of the portions substantially matches the deterministic function value of the corresponding data segment, the method continues at step 426 where the processing module indicates that the one of the portions maps to the corresponding data segment. When a portion of the portions of the modified data object maps to a data segment of the plurality of data segments, the method continues at step 430 where the processing module adds the data segment to a second plurality of data segments for the modified data object. The adding includes creating the second plurality of data segments to have a same number of data segments as the plurality of data segments when the modified data object includes modification to the middle data. The method branches to step 440.

When the deterministic function value of the one of the portions does not substantially match the deterministic function value of the corresponding data segment, the method continues at step 428 where the processing module indicates that the one of the portions does not map to the corresponding data segment. When another portion of the portions of the modified data object does not map to one of the plurality of data segments, the method continues at step 432 where the processing module determines whether the another portion corresponds to beginning data, middle data, or ending data of the modified data object. The method branches to step 438 when the other portion corresponds to ending data. The method branches to step 426 when the other portion corresponds to beginning data. The method continues to step 434 when the other portion corresponds to middle data.

When the other portion corresponds to the middle data of the modified data object, the method continues at step 434 where processing module creates a middle data segment of the second plurality of data segments based on a corresponding middle data segment of the plurality of data segments. The method branches to step 440. When the other portion corresponds to the beginning data of the modified data object, the method continues at step 436 where the processing module creates at least one new beginning data segment for the second plurality of data segments. The method branches to step 440. When the other portion corresponds to the ending data of the modified data object, the method continues at step 438 where the processing module creates at least one new ending data segment for the second plurality of data segments.

The method continues at step 440 where the processing module updates a segment allocation table of the data object with the second plurality of data segments. The method continues at step 442 where the processing module encodes the middle data segment of the second plurality of data segments using the dispersed storage error coding function to produce an encoded data segment. The encoding the middle data segment includes several steps. In a first step, the processing module divides the middle data segment into a matrix of data blocks. In a second step, the processing module creates an encoded data block matrix based on the matrix of data blocks and an encoding matrix of the dispersed storage error coding function. In a third step, the processing module creates a set of encoded data slices from the encoded data block matrix. Alternatively, or in addition to, the processing module encodes one or more of the at least one new beginning data segment and the at least one new ending data segment using the dispersed storage error coding function to produce one or more other encoded data segments.

The method continues at step 444 where the processing module overwrites the corresponding middle data segment with the encoded data segment in the DSN. The overwriting the corresponding middle data segment with the encoded data segment includes identifying an encoded data slices of the set of encoded data slices that is different than a corresponding encoded data slice of a second set of encoded data slices of the corresponding middle data segment and overwriting, in a dispersed storage unit of the DSN, the corresponding encoded data slice with the encoded data slice. Alternatively, or in addition to, the processing module overwrites corresponding one or more other encoded data segments with the one or more other encoded data segments in the DSN.

FIG. 14A is a diagram illustrating an example of a metadata database structure 450 that includes a plurality of metadata fields 1-M and a file source name field 452. The file source name field 452 includes one or more source names of one or more files stored in a dispersed storage network (DSN) memory as a plurality of encoded data slices. For example, a first file is stored in the DSN memory at a source name address of FA032, a second file is stored in the DSN memory at source name address B3C44, and a third file is stored in the DSN memory at source name address EF902. Each of the one or more files is associated with metadata that relates to the file and may describe the file. The metadata may be utilized to select a file of the plurality of files by identifying desired metadata values and/or metadata value ranges.

Each metadata field of the plurality of metadata fields 1-M includes one or more metadata entries that relate to a corresponding file of the plurality of files. For example, metadata entries of a common row of metadata fields are associated with a file stored in the DSN memory at a source name address of the common row. For instance, the file stored at source name address FA032 is associated with a metadata field 1 entry of Sep. 1, 2011, a metadata field 2 entry of longitude 40.1, etc. and a metadata field M entry of latitude −87.2.

The metadata database 450 may be utilized by an application process (e.g. a user device, of an application server) to identify a file stored in the DSN memory based on one or more metadata values. For example, one or more metadata values are utilized as an index into the metadata database 450 to identify a source name of a desired file for retrieval from the DSN memory. For instance, metadata values of Sep. 2, 2011, longitude 40.5, and latitude −87.31 are utilized as the index and compare favorably to a second entry row of the metadata database that includes the metadata 1 field entry of Sep. 2, 2011, the metadata 2 field entry of longitude 40.5, and the metadata field M entry of latitude −87.3. A file source name of B3C44 is extracted from a second row entry of the file source name field. The second file is retrieved from the DSN memory utilizing the source name address of B3C44. The metadata database 450 may be stored in the DSN memory as a backup from time to time as a plurality of encoded database slices.

FIG. 14B is a diagram illustrating an example of a backup table structure 454 that includes a date field 456 and a backup source name field 458. The backup source name field 458 includes one or more backup source name entries, wherein each backup source name is associated with a backup file (e.g., a metadata database backup file) stored as a plurality of encoded data slices in a dispersed storage network (DSN) memory at the backup source name address. The date field 456 includes one or more date entries, wherein each date is associated with when a corresponding backup file was stored in the DSN memory. For example, a first backup file was stored on Sep. 3, 2011 at a backup source name address of D468A, a second backup file was stored on Sep. 4, 2011 and a backup source name address of EE540, and a third backup file was stored on Sep. 4, 2011 at a backup source name address of B69 DB. The backup table 454 may be stored in a primary local memory and as a plurality of sets of encoded backup table slices in the DSN memory. For example, the backup table 454 is stored at a bootstrap DSN address (e.g., 00000) to enable successful rebooting when the primary local memory loses the backup table.

The backup table 454 may include any number of entries. For example, a maximum of 10 entries are maintained such that a backup of a metadata database is performed on a daily basis storing each backup copy of the metadata database in a successive and unique backup source name address location in the DSN memory. An oldest backup may be overwritten when a maximum number of entries have been previously stored. For example, a first backup source name address may be reused when an 11th backup operation is performed to backup the metadata database when the maximum number of entries is 10. A second backup source name address may be reused when a 12th backup operation is performed etc. A method to backup a metadata database utilizing the backup table is discussed in greater detail with reference to FIG. 14C.

Figure 14C:
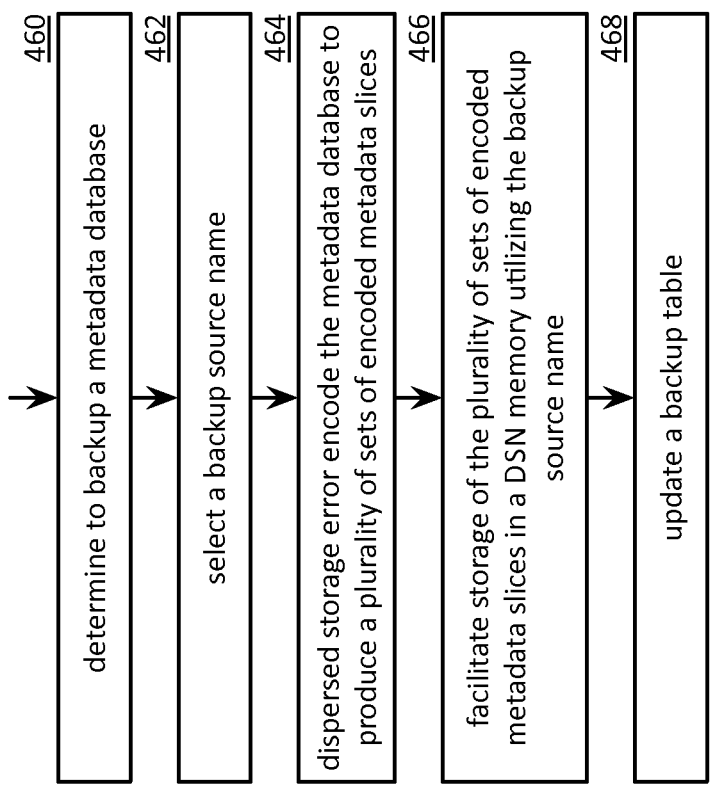
FIG. 14C is a flowchart illustrating an example of backing up a metadata database in accordance with the present invention.

FIG. 14C is a flowchart illustrating an example of backing up a metadata database. The method begins at step 460 where a processing module (e.g., of a user device) determines to backup a metadata database. The determination may be based on one or more of a time period has expired since a last backup, a predetermination, a request, and a reboot detection. A time of the last backup may be determined by retrieving a backup table and extracting a last date entry.

The method continues at step 462 where the processing module selects a backup source name. The selection includes generating a new backup source name, selecting a previously assigned but unused backup source name, and selecting a previously assigned and used backup source name. For example, the processing module generates the new backup source name when a backup table does not exist. For instance, the processing module generates the new backup source name from a list of available source names. As another example, the processing module selects the previously assigned but unused backup source name from the backup table by identifying a source name that is not associated with a date (e.g., unused so far). As yet another example, the processing module selects the previously assigned and used backup source name from the active table by identifying a source name associated with an oldest date entry.

The method continues at step 464 were the processing module dispersed storage error encodes the metadata database to produce a plurality of sets of encoded metadata slices. The method continues at step 466 where the processing module facilitates storage of the plurality of sets of encoded metadata slices in a dispersed storage network (DSN) memory utilizing the backup source name. For example, the processing module sends a plurality of write slice requests to the DSN memory that includes the plurality of sets of encoded metadata slices and a plurality of sets of slice names that includes the backup source name. Alternatively or in addition to, the processing module facilitates deletion of previously stored encoded metadata slices associated with the backup source name when the backup source name was previously used. Alternatively or in addition to, the processing module facilitates overwriting (e.g., with the plurality of sets of encoded metadata slices) of previously stored encoded metadata slices associated with the backup source name when the backup source name was previously used.

The method continues at step 468 where the processing module updates the backup table to include a date entry of a current date (e.g., and time) and the backup source name. For example, the processing module overwrites a date field of an entry corresponding to the backup source name with the current date when the backup source name was previously used. In addition, the processing module dispersed storage error encodes the backup table to produce encoded backup table slices and sends the encoded backup table slices to the DSN memory for storage therein.

FIG. 15A is a flowchart illustrating an example of storing data. The method begins at step 470 where a processing module (e.g., of a user device) obtains a data file for storage in a dispersed storage network (DSN) memory. The method continues at step 472 where the processing module generates a file reference for the data file. The file reference includes at least one of a hash of the data file, a checksum of the data file, and a mask generating function (MGF) produced value. The method continues at step 474 where the processing module sends a data storage request (e.g., to dispersed storage (DS) processing unit) that includes the file reference in a file name corresponding to the data file.

The method continues at step 476 where the processing module receives a response (e.g., from the DS processing unit). The method branches to step 480 when the response includes a send data file request. The method continues to step 478 when the response includes a storage confirmation. The method continues at step 480 where the processing module stores a source name from a confirmation to enable subsequent retrievals. The storage confirmation includes at least one of the filename, file reference, and the source name (e.g., associated with a storage location of the data file within the DSN memory).

The method continues at step 480 where the processing module sends the data file when the response includes the send data file request. The send data file request includes at least one of the filename, the file reference, and a new source name generated for storage of the data file within the DSN memory. For example, the processing module sends the data file to the DS processing unit for storage in the DSN memory at the new source name included in the response. The method continues at step 482 where the processing module stores the new source name from in a local memory (e.g., of the user device) to enable subsequent retrieval of the data file from the DSN memory.

FIG. 15B is a flowchart illustrating an example of processing a data storage request. The method begins at step 484 where a processing module (e.g., of a dispersed storage (DS) processing unit) receives a data storage request from a requesting entity (e.g., a user device) that includes at least one of a file reference and a file name corresponding to a data file. The method continues at step 486 where the processing module determines whether a stored data file is substantially the same as the data file based on the file reference. For example, the processing module searches a named object database to identify a file reference entry that is the same as the file reference of the request. The method branches to step 492 when the processing module determines that the stored data file is not substantially the same as the data file. The method continues to step 488 when the processing module determines that the stored data file is substantially the same as the data file. The method continues at step 488 where the processing module sends the storage confirmation to the requesting entity. The method continues at step 490 where the processing module updates the named object database to include one or more of the filename, the file reference, and a source name associated with the stored data file.

The method continues at step 492 where the processing module sends a send data file request to the requesting entity when the processing module determines that the stored data file is not substantially the same as the data file. The method continues at step 494 where the processing module receives the data file from the requesting entity. The method continues at step 496 where the processing module facilitates storing the data file as a plurality of sets of encoded data slices in a dispersed storage network (DSN) memory utilizing a new source name. For example, the processing module dispersed storage error encodes the data file to produce the plurality of sets of encoded data slices, obtains the new source name, generates a plurality of sets of slice names wherein each slice name includes the new source name, generates one or more sets of write slice requests that includes the plurality of sets of encoded data slices in the plurality of sets of slice names, and sends the one or more sets of write slice requests to the DSN memory. The method continues at step 498 where the processing module updates the named object database to include a new entry that includes one or more of the filename, file reference, and the new source name.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/ or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method comprises:
    receiving a modified data object for storage in a dispersed storage network (DSN), wherein the modified data object is a modified version of a data object and wherein the data object is divided into a plurality of data segments that is encoded using a dispersed storage error coding function and stored in the DSN;
    mapping portions of the modified data object to the plurality of data segments that includes:
        when a portion of the portions of the modified data object maps to a data segment of the plurality of data segments, adding the data segment to a second plurality of data segments for the modified data object;
        when another portion of the portions of the modified data object does not map to one of the plurality of data segments, determining whether the another portion corresponds to beginning data, middle data, or ending data of the modified data object; and
        when the another portion corresponds to the middle data of the modified data object, creating a middle data segment of the second plurality of data segments based on a corresponding middle data segment of the plurality of data segments;
    encoding the middle data segment of the second plurality of data segments using the dispersed storage error coding function to produce an encoded data segment; and
    overwriting the corresponding middle data segment with the encoded data segment in the DSN.

2. The method of claim 1 further comprises:
    partitioning the modified data object into the portions based on known size of data segments of the plurality of data segments of the data object.

3. The method of claim 1, wherein the mapping comprises:
    comparing a deterministic function value of one of the portions of the modified data object with a deterministic function value of a corresponding data segment of the plurality of data segments;
    when the deterministic function value of the one of the portions substantially matches the deterministic function value of the corresponding data segment, indicating that the one of the portions maps to the corresponding data segment; and
    when the deterministic function value of the one of the portions does not substantially match the deterministic function value of the corresponding data segment, indicating that the one of the portions does not map to the corresponding data segment.

4. The method of claim 3 further comprises:
accessing a segment allocation table to obtain the deterministic function value of the corresponding data segment.

5. The method of claim 1 further comprises:
updating a segment allocation table of the data object with the second plurality of data segments.

6. The method of claim 1 further comprises:
when the another portion corresponds to the beginning data of the modified data object, creating at least one new beginning data segment for the second plurality of data segments.

7. The method of claim 1 further comprises:
when the another portion corresponds to the ending data of the modified data object, creating at least one new ending data segment for the second plurality of data segments.

8. The method of claim 1 further comprises:
creating the second plurality of data segments to have a same number of data segments as the plurality of data segments when the modified data object includes modification to the middle data.

9. The method of claim 1 further comprises:
the encoding the middle data segment including:
   dividing the middle data segment into a matrix of data blocks;
   creating an encoded data block matrix based on the matrix of data blocks and an
   encoding matrix of the dispersed storage error coding function; and
   creating a set of encoded data slices from the encoded data block matrix;
the overwriting the corresponding middle data segment with the encoded data segment including:
   identifying an encoded data slices of the set of encoded data slices that is different than a corresponding encoded data slice of a second set of encoded data slices of the corresponding middle data segment; and
   overwriting, in a dispersed storage unit of the DSN, the corresponding encoded data slice with the encoded data slice.

10. A dispersed storage (DS) module comprises:
a first module, when operable within a computing device, causes the computing device to:
   receive a modified data object for storage in a dispersed storage network (DSN), wherein the modified data object is a modified version of a data object and wherein the data object is divided into a plurality of data segments that is encoded using a dispersed storage error coding function and stored in the DSN;
a second module, when operable within the computing device, causes the computing device to map portions of the modified data object to the plurality of data segments that includes:
   when a portion of the portions of the modified data object maps to a data segment of the plurality of data segments, add the data segment to a second plurality of data segments for the modified data object;
   when another portion of the portions of the modified data object does not map to one of the plurality of data segments, determine whether the another portion corresponds to beginning data, middle data, or ending data of the modified data object; and
   when the another portion corresponds to the middle data of the modified data object, create a middle data segment of the second plurality of data segments based on a corresponding middle data segment of the plurality of data segments;
a third module, when operable within the computing device, causes the computing device to:
   encode the middle data segment of the second plurality of data segments using the dispersed storage error coding function to produce an encoded data segment; and
a fourth module, when operable within the computing device, causes the computing device to:
   overwrite the corresponding middle data segment with the encoded data segment in the DSN.

11. The DS module of claim 10, wherein the second module further functions to:
partition the modified data object into the portions based on known size of data segments of the plurality of data segments of the data object.

12. The DS module of claim 10, wherein the second module functions to map by:
comparing a deterministic function value of one of the portions of the modified data object with a deterministic function value of a corresponding data segment of the plurality of data segments;
when the deterministic function value of the one of the portions substantially matches the deterministic function value of the corresponding data segment, indicating that the one of the portions maps to the corresponding data segment; and
when the deterministic function value of the one of the portions does not substantially match the deterministic function value of the corresponding data segment, indicating that the one of the portions does not map to the corresponding data segment.

13. The DS module of claim 12, wherein the second module further functions to:
access a segment allocation table to obtain the deterministic function value of the corresponding data segment.

14. The DS module of claim 12, wherein the second module further functions to:
update a segment allocation table of the data object with the second plurality of data segments.

15. The DS module of claim 12, wherein the second module further functions to:
when the another portion corresponds to the beginning data of the modified data object, create at least one new beginning data segment for the second plurality of data segments.

16. The DS module of claim 12, wherein the second module further functions to:
when the another portion corresponds to the ending data of the modified data object, create at least one new ending data segment for the second plurality of data segments.

17. The DS module of claim 12, wherein the second module further functions to:
create the second plurality of data segments to have a same number of data segments as the plurality of data segments when the modified data object includes modification to the middle data.

18. The DS module of claim 12 further comprises:
the third module functions to encode the middle data segment by:
   dividing the middle data segment into a matrix of data blocks;
   creating an encoded data block matrix based on the matrix of data blocks and an encoding matrix of the dispersed storage error coding function; and creating a set of encoded data slices from the encoded data block matrix;
the fourth module functions to the overwrite the corresponding middle data segment with the encoded data segment by:
identifying an encoded data slice of the set of encoded data slices that is different than a corresponding encoded data slice of a second set of encoded data slices of the corresponding middle data segment; and
overwriting, in a dispersed storage unit of the DSN, the corresponding encoded data slice with the encoded data slice.

* * * * *

UNITED STATES PATENT AND TRADEMARK OFFICE
CERTIFICATE OF CORRECTION

PATENT NO.        : 8,782,492 B2
APPLICATION NO.   : 13/588350
DATED             : July 15, 2014
INVENTOR(S)       : Resch et al.

Page 1 of 1

It is certified that error appears in the above-identified patent and that said Letters Patent is hereby corrected as shown below:

In the Claims

Col. 47, line 3, in claim 18: Before "overwrite" delete "the"

Signed and Sealed this
Thirtieth Day of June, 2015

Michelle K. Lee
*Director of the United States Patent and Trademark Office*